United States Patent
Kawanishi et al.

(10) Patent No.: US 7,460,728 B2
(45) Date of Patent: Dec. 2, 2008

(54) IMAGE PROCESSING APPARATUS AND METHOD, RECORDING MEDIUM, AND PROGRAM

(75) Inventors: Isao Kawanishi, Kanagawa (JP); Miyuki Okada, Kanagawa (JP); Nobuyuki Sato, Tokyo (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 10/921,284

(22) Filed: Aug. 19, 2004

(65) Prior Publication Data

US 2005/0089241 A1 Apr. 28, 2005

(30) Foreign Application Priority Data

Sep. 5, 2003 (JP) ............................. 2003-313521
Apr. 23, 2004 (JP) ............................. 2004-128251

(51) Int. Cl.
*G06K 9/40* (2006.01)
(52) U.S. Cl. ....................................... 382/274; 382/286
(58) Field of Classification Search ................. 382/274, 382/286; 348/241; 358/3.26, 461
See application file for complete search history.

(56) References Cited

U.S. PATENT DOCUMENTS

| 6,195,469 B1* | 2/2001 | Nishioka et al. ............ 382/274 |
|---|---|---|
| 6,707,955 B1* | 3/2004 | Shiomi ........................ 382/312 |
| 7,075,569 B2* | 7/2006 | Niikawa .................... 348/218.1 |
| 2002/0025164 A1* | 2/2002 | Suzuki ........................ 396/429 |
| 2002/0094131 A1* | 7/2002 | Shirakawa ................... 382/274 |
| 2003/0156204 A1* | 8/2003 | Sato et al. ................. 348/222.1 |

OTHER PUBLICATIONS

Patent Abstracts of Japan, JP 9-307789, Nov. 28, 1997.

* cited by examiner

*Primary Examiner*—Duy M Dang
(74) *Attorney, Agent, or Firm*—Oblon, Spivak, McClelland, Maier & Neustadt, P.C.

(57) ABSTRACT

For each pixel read from an imaging device, a horizontal counter value and a vertical counter value corresponding to the pixel are supplied from a signal generator to a distance computation section via an optical-axis-center coordinate setting section and an up-and-down and right-and-left weighting section. In the distance computation section, the distance to the optical-axis center is computed, and correction coefficients for the zoom wide end and for the zoom tele end, which correspond to the distance, are obtained by look-up tables. The two obtained correction coefficients are blended at a mixture ratio determined by a blend ratio setting section. The blended shading correction coefficients are gain adjusted by a gain adjustment section, after which they are supplied to a correction section. As a result, a correction corresponding to the distance to the optical-axis-center position is performed on the signal of each pixel supplied from an imaging section.

16 Claims, 17 Drawing Sheets

IMAGE PROCESSING APPARATUS AND METHOD, RECORDING MEDIUM, AND PROGRAM

BACKGROUND OF THE INVENTION

1. Field of the Invention

The present invention relates to an image processing apparatus and method, a recording medium, and a program. More particularly, the present invention relates to an image processing apparatus and method capable of correcting shading (sensitivity nonuniformity) of a captured image in a case where, for example, a subject is recorded by a video camera having a digital still camera function, a PDA (Personal Digital Assistant), a cellular phone, a PHS (Personal Handyphone System) or the like, to a recording medium therefor, and to a program therefor.

2. Description of the Related Art

In an imaging apparatus having a lens system and an imaging section, in general, it is known that shading (sensitivity nonuniformity) occurs in a captured image due to, for example, a reduction in the amount of peripheral light due to a lens system.

In recent years, as the cell size of imaging devices has been minimized, the construction in the height direction of wiring of imaging devices has been relatively minimized, and the pupil distance has been shortened as a result of a size reduction of lenses, causing shading to likely occur in a captured image.

The principles of this shading are described in, for example, Japanese Unexamined Patent Application Publication No. 2002-218298 as follows. In the imaging device, in order to improve light sensitivity for each pixel, a microlens is provided for each photosensitive pixel portion of the imaging device. When light beams passing through an image-capturing lens nearly vertically enter the photosensitive section of the imaging device, the incident light beams are collected on the photosensitive section of the imaging device almost without any problems. On the other hand, when the light beams passing through an image-capturing lens obliquely enter the imaging device, due to the optical relation between the image-capturing lens and the microlens, only some of the original incident light beams enter each photosensitive section of an area away from the optical axis of the image-capturing lens (i.e., peripheral portions of the imaging device), and shading occurs.

This phenomenon becomes more intense as the pixel position on the imaging device becomes further away from the optical axis of the image-capturing lens. Furthermore, in the case of an imaging device of a large size, in some of the image-capturing lenses, the angle of the incidence of the light beams to the peripheral portion of the imaging device becomes larger. In this case, shading in which the sensitivity decreases occurs in the peripheral portion of the imaging device, where the incidence angle becomes larger, due to the position of the microlens, manufacture variations of on-chip color filters, the device structure of the imaging device, and the like.

As a method of preventing the occurrence of such shading, for example, the lens system may be designed with a large number of lenses. Such a lens system designed with a large number of lenses is expensive, and application in so-called consumer products is often difficult.

On the other hand, for example, when extraction of signals is performed in accordance with the XY coordinates as in devices incorporating semiconductor imaging devices, the image can be corrected by a digital process on the extracted signal. Accordingly, in the field of scanners, etc., hitherto, various technologies for digitally correcting lens shading, such as distortion which occurs because photo-taking is performed by an inexpensive lens system, reduction of the amount of peripheral light, or color blur, have been proposed (see, for example, Japanese Unexamined Patent Application Publication Nos. 11-355511 and 2000-41183).

However, all of these conventional technologies are performed by being restricted to the field of scanners, etc. (for example, a considerable time can be taken for correction processing), and correction processing in real time is not required as in a digital still camera.

In comparison, various technologies relating to an imaging apparatus and a shading correction method for eliminating sensitivity nonuniformity on the plane of the imaging device, and an imaging apparatus and a shading correction method for correcting color shading which occurs in specific color channels of the imaging device (see, for example, Japanese Unexamined Patent Application Publication Nos. 2002-218298 and 2000-41179) have been proposed.

According to Japanese Unexamined Patent Application Publication No. 2002-218298, shading correction coefficients corresponding to pixels which are arranged two-dimensionally on the plane of the imaging device are stored in storage means, so that the correction coefficient is corrected so as to correspond to at least one of the zoom position of the image-capturing lens, the focus position, the image height, the aperture stop value, the exit pupil position, and the amount of strobe light emission.

According to Japanese Unexamined Patent Application Publication No. 2000-41179, shading correction data is calculated by a CPU (Central Processing Unit), the data is written into rewritable recording means (for example, RAM (Random Access Memory)), shading correction data is read in accordance with a captured image signal read from a CCD (Charge-Coupled Device), and shading correction is performed by multiplying the captured image signal by the digital signal after the photographic signal is converted from analog into digital form, thus making it possible to perform high-speed and accurate shading correction. Furthermore, as a result of being configured in such a manner that a program used for computations by the CPU can be changed externally, an image input device capable of performing shading correction of photo-taking corresponding to the scene of a subject (for example, corresponding to reverse optical correction and illumination) can be provided.

According to the technology of Japanese Unexamined Patent Application Publication No. 2000-41179, the number of types of the step of storing a shading correction coefficient corresponding to each of the pixels arranged two-dimensionally on the plane of the imaging device is one. For example, when the zoom position of the lens is moved from the wide end to the tele end, the correction coefficient needs to be corrected in such a manner as to correspond to each continuous zoom position.

Part A of FIG. 1 shows shading characteristics in the relationship between the amount of light (the vertical axis) and the position of the zoom wide end (the horizontal direction). Part B of FIG. 1 shows shading characteristics in the relationship between the amount of light (the vertical axis) and the position of the zoom tele end (the horizontal direction). As shown in part A of FIG. 1, shading characteristics L1 at the zoom wide end are gradual reduction of the amount of light, whereas, as shown in part B of FIG. 1, shading characteristics L2 at the tele wide end often have characteristics such that the amount of light decreases sharply at the peripheral portion of the image plane. As a result, problems arise in that it is difficult to correct the correction coefficient while moving the zoom position and to maintain the correction accuracy, and also in that the circuit scale and the correction program become larger.

The same applies to the focus position of the image-capturing lens, the image height, the aperture stop value, the exit pupil position, and the amount of strobe light emission.

SUMMARY OF THE INVENTION

The present invention has been made in view of such circumstances. The present invention aims to correct shading without increasing the circuit scale and the program scale even if one of the zoom position of an image-capturing lens, the focus position, the image height, the aperture stop value, the exit pupil position, and the amount of strobe light emission is at a position between two ends.

In one aspect, the present invention provides an image processing apparatus for correcting shading of a captured image, the image processing apparatus including: a first distance computation section for computing the distance from the image-plane center to each pixel by multiplying the distance by a distance gain; an obtaining section for obtaining a correction value for correcting the shading of the image on the basis of the distance computed by the first distance computation section; and a correction section for correcting the signal of each of the pixels on the basis of the correction value obtained by the obtaining section.

The obtaining section may obtain a plurality of the correction values.

The image processing apparatus may further include: a mixture-ratio setting section for setting the mixture ratio of the plurality of correction values obtained by the obtaining section; and a mixing section for mixing the plurality of correction values on the basis of the mixture ratio set by the mixture-ratio setting section, wherein the correction section may correct the signal of each of the pixels on the basis of the correction value mixed by the mixing section.

The mixture-ratio setting section may set the mixture ratio on the basis of the lens zoom position, the focus position, the image height, the aperture stop value, the exit pupil position, and the amount of strobe light emission.

The image processing apparatus may further include a gain adjustment section for adjusting the gain of the correction value obtained by the obtaining section.

The image processing apparatus may further include, when the image is composed of three colors of a G pixel, an R pixel, and a B pixel: a second distance computation section for computing the distance from the image-plane center to each pixel by multiplying the distance by a distance gain in accordance with the G pixel; a first distance balance gain correction section for multiplying the distance gain in which the G pixel is used as a reference by the distance balance gain of the R pixel; and a second distance balance gain correction section for multiplying the distance gain in which the G pixel is used as a reference by the distance balance gain of the B pixel.

The image processing apparatus may further include, when the image is composed of four colors of a Gr pixel, an R pixel, a B pixel, and a Gb pixel, or four colors of an E pixel, an R pixel, a B pixel, and a G pixel: a second distance computation section for computing the distance from the image-plane center to each pixel by multiplying the distance by a distance gain in accordance with the Gb pixel or the G pixel; a first balance gain correction section for multiplying the distance gain in which the Gb pixel or the G pixel is used as a reference by the distance balance gain of the R pixel; a second balance gain correction section for multiplying the distance gain in which the Gb pixel or the G pixel is used as a reference by the distance balance gain of the B pixel; and a third balance gain correction section for multiplying the distance gain in which the Gb pixel or the G pixel is used as a reference by the distance balance gain of the Gr pixel or the E pixel.

In another aspect, the present invention provides an image processing method for use with an image processing apparatus for correcting shading of a captured image, the image processing method including: a first distance computation step of computing the distance from the image-plane center to each pixel by multiplying the distance by a distance gain; an obtaining step of obtaining a correction value for correcting the shading of the image on the basis of the distance computed in the first distance computation step; and a correction step of correcting the signal of each of the pixels on the basis of the correction value obtained in the obtaining step.

In another aspect, the present invention provides a recording medium having recorded thereon a computer-readable program executable to perform image processing for correcting shading of a captured image, the program including: a first distance computation step of computing the distance from the image-plane center to each pixel by multiplying the distance by a distance gain; an obtaining step of obtaining a correction value for correcting the shading of the image on the basis of the distance computed in the first distance computation step; and a correction step of correcting the signal of each of the pixels on the basis of the correction value obtained in the obtaining step.

In another aspect, the present invention provides a program for allowing a computer to execute image processing of an image processing apparatus for correcting shading of a captured image, the program including: a first distance computation step of computing the distance from the image-plane center to each pixel by multiplying the distance by a distance gain; an obtaining step of obtaining a correction value for correcting the shading of the image on the basis of the distance computed in the first distance computation step; and a correction step of correcting the signal of each of the pixels on the basis of the correction value obtained in the obtaining step.

In the present invention, the distance from the image-plane center to each pixel is computed by multiplying the distance by a distance gain by dividing into an up-and-down portion and a right-to-left portion of the image plane.

DETAILED DESCRIPTION OF THE PREFERRED EMBODIMENTS

The best mode for practicing the present invention will now be described below. Before that, the corresponding relationship between the invention described in the specification and the embodiments will be described with examples as follows. Even if there is an embodiment which is not described here as an embodiment corresponding to the invention although described in another specification, this fact does not mean that the embodiment does not correspond to the invention. Conversely, even if the embodiment is described here as that corresponding to the invention, this fact does not mean that the embodiment does not correspond to the invention other than that invention.

Furthermore, this description does not mean that all the aspects of the invention corresponding to the embodiments described in the specification are described. In other words, this description does not deny the existence of another invention described in another specification, that is, the existence of an invention, which will be divisionally applied for patent, or will appear or will be added by amendments in the future.

Figure 3:
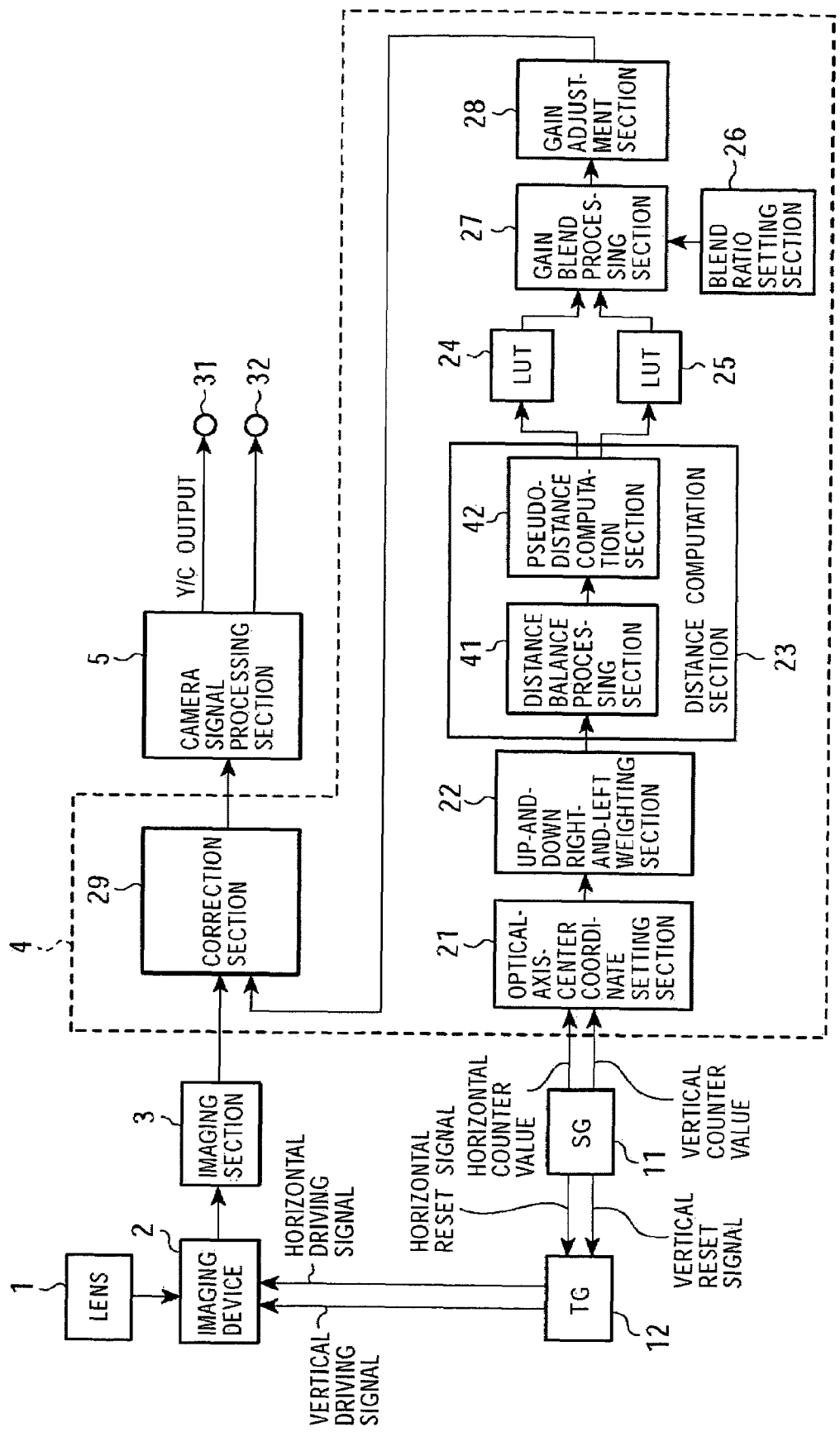
FIG. 3 shows an example of the configuration of an imaging system of a digital still camera.
Figure 9:
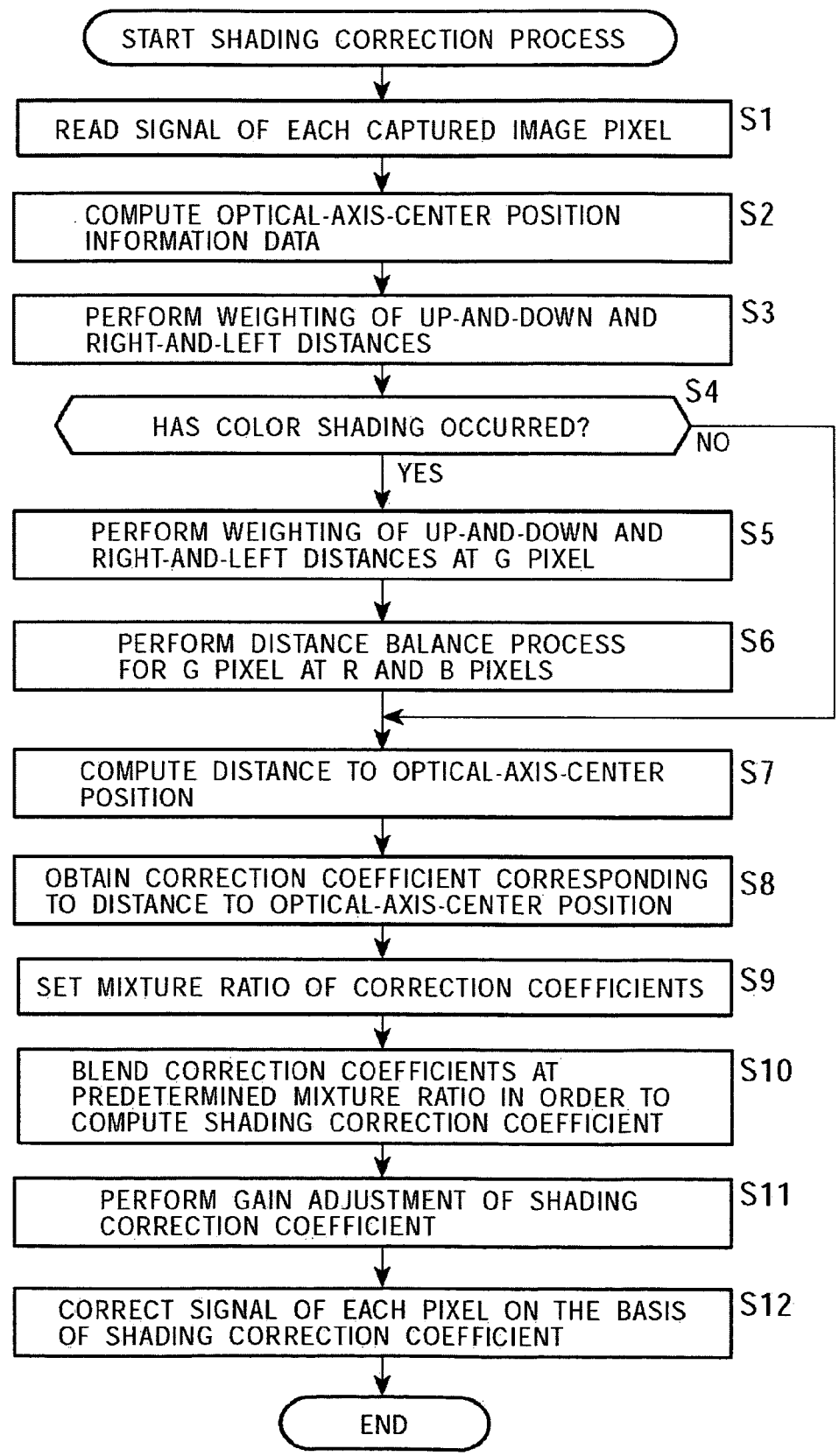
FIG. 9 is a flowchart illustrating a shading correction process performed by the digital still camera shown in FIG. 3.

An image processing apparatus (for example, a digital still camera of FIG. 3) as set forth in the first aspect of the present invention is an image processing apparatus for correcting the shading of a captured image, the image processing apparatus including a first distance computation section (for example, an up-and-down and right-and-left weighting section 22 of FIG. 3 for performing processing of step S3 in FIG. 9, and a pseudo-distance computation section 42 of a distance computation section 23 of FIG. 3 for performing processing of step S7) for computing the distance from the image-plane center to each pixel by multiplying the distance by a distance gain; an obtaining section (for example, look-up tables 24 and 25 of FIG. 3 for performing processing of step S8 in FIG. 9) for obtaining a correction value for correcting the shading of an image on the basis of the distance computed by the first distance computation section; and a correction section (for example, a correction section 29 of FIG. 3 for performing processing of step S12 in FIG. 9) for correcting the signal of each pixel on the basis of the correction value obtained by the obtaining section.

The obtaining section of the image processing apparatus obtains a plurality of correction values (for example, a correction coefficient for a zoom wide end, and a correction coefficient for a zoom tele end).

The image processing apparatus of the present invention further includes mixture-ratio setting means (for example, a blend ratio setting section 26 of FIG. 3 for performing processing of step S9 in FIG. 9) for setting the mixture ratio of the plurality of correction values obtained by the obtaining section; and a mixing section (for example, a gain blend processing section 27 of FIG. 3 for performing processing of step S10 in FIG. 9) for mixing the plurality of correction values on the basis of the mixture ratio set by the mixture-ratio setting means, wherein the correction section corrects the signal of each pixel on the basis of the correction value mixed by the mixing section.

The mixture-ratio setting means of the image processing apparatus of the present invention sets the mixture ratio on the basis of the lens zoom position, the aperture stop value, the focus position, the image height, the exit pupil position, or the amount of strobe light emission (for example, in accordance with a predetermined position between the minimum side and the maximum side).

The image processing apparatus of the present invention further includes a gain adjustment section (for example, a gain adjustment section 28 of FIG. 3 for performing processing of step S11 in FIG. 9) for adjusting the gain of the correction value obtained by the obtaining section.

The image processing apparatus of the present invention further includes, when the image is composed of three colors of a G pixel, an R pixel, and a B pixel: a second distance computation section (for example, an up-and-down and right-and-left weighting section 22 of FIG. 3 for performing processing of step S5 in FIG. 9) for computing the distance from the image-plane center to each pixel by multiplying the distance by a distance gain in accordance with the G pixel; a first distance balance gain correction section (for example, a distance balance processing section 41 of FIG. 3 for performing processing of step S6 in FIG. 9) for multiplying the distance gain in which the G pixel is used as a reference by the distance balance gain of the R pixel; and a second distance balance gain correction section (for example, the distance balance processing section 41 of FIG. 3 for performing processing of step S6 in FIG. 9) for multiplying the distance gain in which the G pixel is used as a reference by the distance balance gain of the B pixel.

The image processing apparatus of the present invention further includes, when the image is composed of four colors of a Gr pixel, an R pixel, a B pixel, and a Gb pixel, or four colors of an E pixel, an R pixel, a B pixel, and a G pixel: a second distance computation section (the up-and-down and right-and-left weighting section 22 of FIG. 3 for performing processing of step S5 in FIG. 9) for computing the distance from the image-plane center to each pixel by multiplying the distance by a distance gain in accordance with the Gb pixel or the G pixel; a first distance balance gain correction section (the distance balance processing section 41 of FIG. 3 for performing processing of step S6 in FIG. 9) for multiplying the distance gain in which the Gb pixel or the G pixel is used as a reference by the up-and-down and right-to-left distance balance gain of the R pixel; a second distance balance gain correction section (the distance balance processing section 41 of FIG. 3 for performing processing of step S6 in FIG. 9) for multiplying the distance gain in which the Gb pixel or the G pixel is used as a reference by the distance balance gain of the B pixel; and a third distance balance gain correction section (the distance balance processing section 41 of FIG. 3 for performing processing of step S6 in FIG. 9) for multiplying the distance gain in which the Gb pixel or the G pixel is used as a reference by the distance balance gain of the Gr pixel or the E pixel.

The image processing method for use with an image processing apparatus (for example, the digital still camera of FIG. 3) for correcting shading of a captured image as set forth in the second aspect of the present invention includes: a first distance computation step (for example, steps S3 and S7 in FIG. 9) of computing the distance from the image-plane center to each pixel by multiplying the distance by a distance gain; an obtaining step (for example, step S8 in FIG. 9) of obtaining a correction value for correcting the shading of the image on the basis of the distance computed in the process of the first distance computation step; and a correction step (for example, step S12 in FIG. 9) of correcting the signal of each of the pixels on the basis of the correction value obtained in the process of the obtaining step.

The image processing method of the present invention further includes, when the image is composed of three colors of a G pixel, an R pixel, and a B pixel: a second distance computation step (for example, step S5 in FIG. 9) of computing the distance from the image-plane center to each pixel by multiplying the distance by a distance gain by using the G pixel as a reference; a first distance balance gain correction step (for example, step S6 in FIG. 9) of multiplying the distance gain in which the G pixel is used as a reference by the distance balance gain of the R pixel; and a second distance balance gain correction step (for example, step S6 in FIG. 9) of multiplying the distance gain in which the G pixel is used as a reference by the distance balance gain of the B pixel.

The image processing method of the present invention further includes, when the image is composed of four colors of a Gr pixel, an R pixel, a B pixel, and a Gb pixel, or four colors of an E pixel, an R pixel, a B pixel, and a G pixel: a second distance computation step (for example, step S5 of FIG. 9) of computing the distance from the image-plane center to each pixel by multiplying the distance by a distance gain in accordance with the Gb pixel or the G pixel; a first distance balance gain correction step (for example, step S6 of FIG. 9) of multiplying the distance gain in which the Gb pixel or the G pixel is used as a reference by the distance balance gain of the R pixel; a second distance balance gain correction step (for example, step S6 of FIG. 9) of multiplying the distance gain in which the Gb pixel or the G pixel is used as a reference by the distance balance gain of the B pixel; and a third distance balance gain correction step (for example, step S6 of FIG. 9) of multiplying the distance gain in which the Gb pixel or the G pixel is used as a reference by the distance balance gain of the Gr pixel or the E pixel.

In the program recorded on the recording medium as set forth in the third aspect of the present invention, and the program as set forth in the fourth aspect of the present invention, an embodiment (one example) to which each step corresponds is identical to that of the image processing method as set forth in the second aspect of the present invention.

Embodiments of the present invention will now be described below with reference to the drawings.

Figure 1:
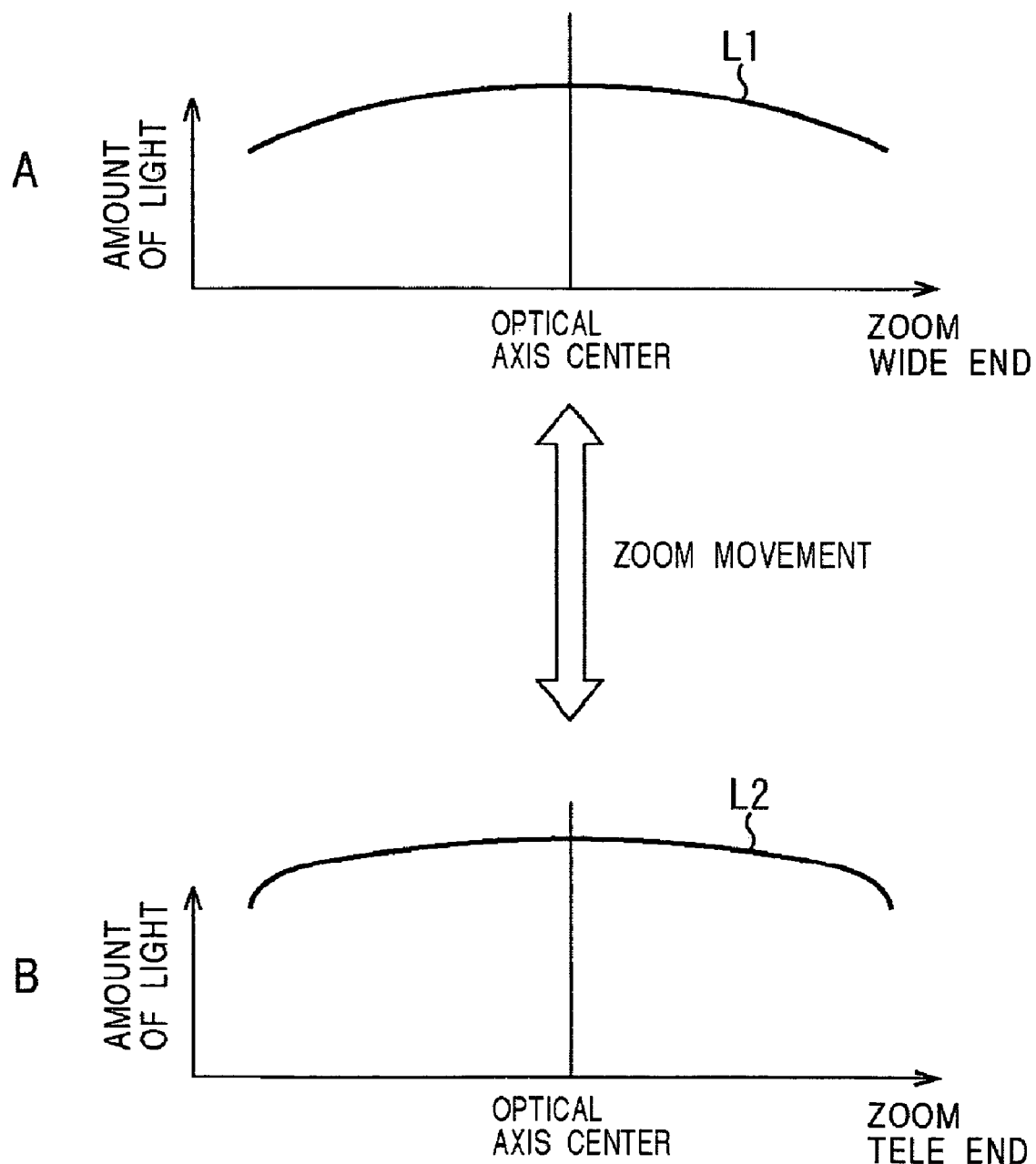
FIG. 1 shows shading characteristics.
Figure 2:
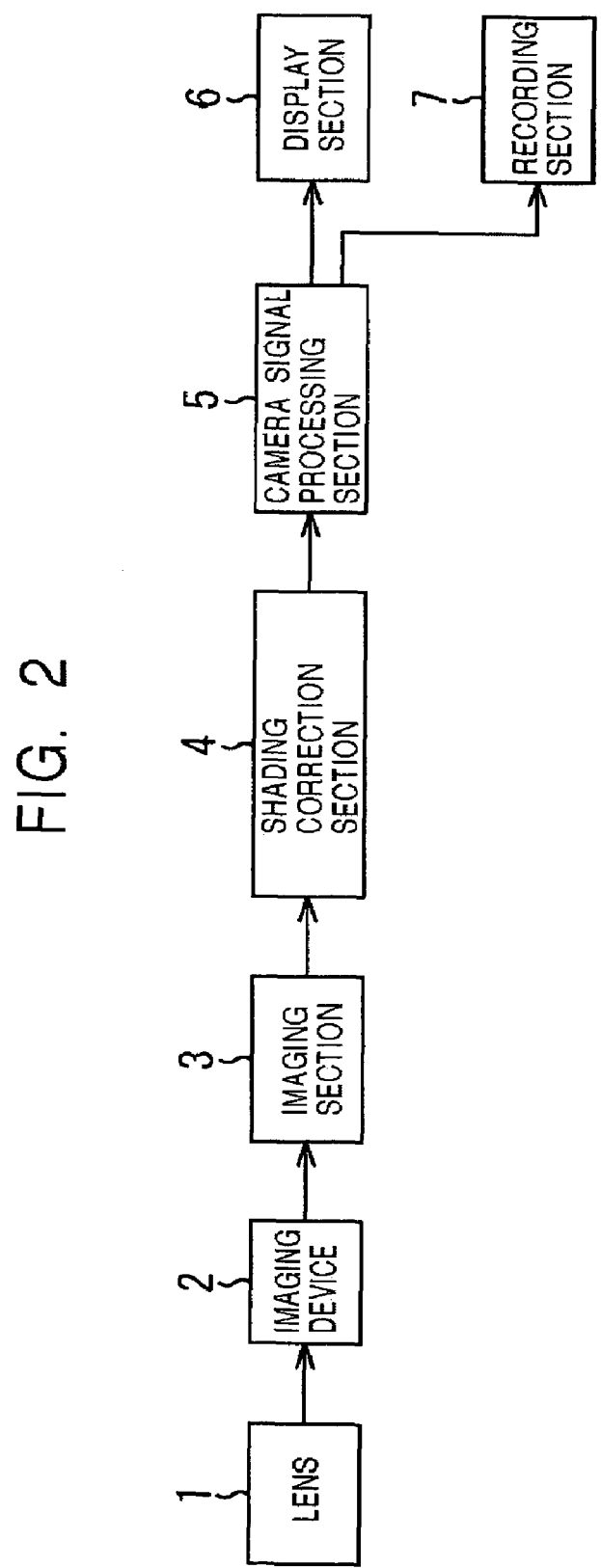
FIG. 2 is a block diagram showing an example of the basic configuration of a camera system to which the present invention is applied.

FIG. 2 is a block diagram showing an example of the basic configuration of a camera system to which the present invention is applied. In this example of the configuration, the camera system is broadly divided into three blocks of (i) an imaging system including a lens 1, an imaging device 2, an imaging section 3 having a CDS (Correlated Double Sampling) circuit; an AGC (Automatic Gain Control) circuit; and an A/D (Analog to Digital) converter, a shading correction section 4, and a camera signal processing section 5; (ii) a display system including a display section 6; and (iii) a recording system including a recording section 7.

The lens 1 allows light (i.e., a video image of a subject) to enter the imaging device 2. The imaging device 2 is, for example, such that photoelectric conversion devices for performing photoelectric conversion, including CCD (Charge Coupled Devices) imagers and C-MOS (Complementary Metal Oxide Semiconductor) imagers, are arranged two-dimensionally, with R, G, and B primary-color filters (not shown) arranged in a mosaic form being disposed in front of the photoelectric conversion devices. That is, the imaging device 2 photoelectrically converts an optical image of a subject, which enters via the lens 1 and the primary-color filters, in order to generate a captured image signal (charge), and outputs the generated captured signal to the imaging section 3 by a raster scanning method. For the primary-color filters, complementary-color-system filters in which Ye, Cy, Mg, and G filters are arranged in a mosaic form may be used.

In the imaging section 3, noise reduction is performed on the captured image signal output from the imaging device 2 at the CDS circuit, and gain adjustment is performed on the signal at the AGC circuit, the signal is converted from an analog signal into a digital signal at the A/D converter, after which the signal is supplied to the shading correction section 4.

The shading correction section 4 corrects the reduction of the amount of peripheral light of the image-capturing plane due to lens shading with respect to the captured image data supplied from the imaging section 3, and thereafter, supplies the data to the camera signal processing section 5.

The camera signal processing section 5 performs signal processing, such as gamma processing, color separation processing, and YUV conversion at a ratio of 4:2:2, on the captured image data supplied from the shading correction section 4 so as to generate image data composed of luminance signal data and chroma signal data. The camera signal processing section 5 supplies the generated image data to the display section 6, whereby the corresponding image is displayed, or supplies the generated image data to the recording section 7, whereby the image data is recorded.

The display section 6 includes, for example, an LCD (Liquid-Crystal Display), and displays the image of a subject supplied from the camera signal processing section 5. The recording section 7 controls, for example, a removable medium such as a magnetic disk, an optical disk, a magneto-optical disk, or a semiconductor memory, and records image data supplied from the camera signal processing section 5 on the removable medium.

Next, a description will be given of the operation of correcting shading of the camera system configured as described above.

An optical image of a subject enters the imaging device 2 via the lens 1, and as a result of being photoelectrically converted thereby, a captured image signal is generated. The captured image signal is subjected to noise reduction, gain adjustment, and A/D conversion in the imaging section 3, and is output as captured image data (a digital video signal) to the shading correction section 4. Here, since shading is considered to occur in proportion to the distance from the optical-axis center, the distance from the optical-axis center is computed by the shading correction section 4, a shading correction coefficient corresponding to the distance is read from the correction coefficient table, and the shading is corrected by multiplying the captured image data by the correction coefficient. Then, the camera signal processing section 5 performs signal processing, such as gamma processing, color separation processing, and YUV conversion on the captured image data in which shading is corrected, thereby generating image data composed of luminance signal data and chroma signal data. The camera signal processing section 5 outputs the generated image data to the display section 6 or the recording section 7.

Next, a description will be given below of a specific example of the camera system shown in FIG. 2.

FIG. 3 shows an example of the configuration of an imaging system of a digital still camera provided with a function for correcting, for example, the reduction of the amount of peripheral light in real time by reading the correction table based on the distance to the optical-axis center. Components in FIG. 3, which correspond to those of FIG. 2, are designated with the corresponding reference numerals, and descriptions thereof are omitted where appropriate.

A signal generator (SG) 11 generates a horizontal reset signal and a vertical reset signal, and supplies these signals to a timing generator (TG) 12. Also, the signal generator 11 generates a horizontal counter value and a vertical counter value, and supplies these signals to an optical-axis-center coordinate setting section 21 of the shading correction section 4.

Based on the horizontal reset signal and the vertical reset signal supplied from the signal generator 11, the timing generator 12 generates a horizontal driving signal and a vertical driving signal, and supplies these signals to the imaging device 2. As a result, the signal of each pixel at which an image is captured is read from the imaging device 2 in accordance with the horizontal driving signal and the vertical driving signal generated at the timing generator 12.

Based on the horizontal counter value and the vertical counter value supplied from the signal generator 11, the optical-axis-center coordinate setting section 21 computes optical-axis-center position information data. For example, when the pixel length in the horizontal direction of 5 million pixels is 2560 pixels, in order that the value of the optical-axis center becomes zero, this is achieved by subtracting the value of ½ of the pixel length, that is, the value of 1280, from the horizontal counter value. Furthermore, when the line length in the vertical direction of 5 million pixels is 1920 lines, in order that the value of the optical-axis center becomes zero, this is achieved by subtracting the value of ½ of the line length, that is, the value of 960, from the vertical counter value.

The up-and-down and right-and-left weighting section 22 multiplies the horizontal counter value by the horizontal distance gain on the right side or the horizontal distance gain on the left side, the distance gain being used as a weight, when viewed from the optical-axis-center position based on the optical-axis-center position information data computed by the optical-axis-center coordinate setting section 21. For example, in a case where the pixel length in the horizontal direction of 5 million pixels is 2560 pixels, if the value of ½ of the pixel length, that is, the value of 1280, is subtracted from the horizontal counter value, the value of zero is computed in a portion in the optical-axis center, a negative value is computed in a portion to the left of the optical-axis center, and a positive value is computed in a portion to the right of the optical-axis center. In this manner, in the up-and-down and right-and-left weighting section 22, a determination is made as to which is the left side or the right side when viewed from the optical-axis-center position, and the right-side horizontal distance gain or the left-side vertical distance gain, which is used as a weight, is multiplied to the horizontal counter value.

Furthermore, the up-and-down and right-and-left weighting section 22 multiplies the vertical counter value by the vertical distance gain on the upper side or the vertical distance gain on the lower side, the distance gain being used as a weight, when viewed from the optical-axis-center position based on the optical-axis-center position information data computed by the optical-axis-center coordinate setting section 21. For example, when the line length in the vertical direction of 5 million pixels is 1920 lines, if the value of ½ of the line length, that is, the value of 960, is subtracted from the vertical counter value, the value of zero is computed in the optical-axis center, a negative value is computed above the optical-axis center, and a positive value is computed below the optical-axis center. In this manner, in the up-and-down and right-and-left weighting section 22, a determination is made as to which is the upper side or the lower side when viewed from the optical-axis-center position, and the horizontal distance gain on the upper side or the vertical distance gain on the lower side, the distance gain being used as a weight, is multiplied to the vertical counter value.

Furthermore, in order to perform weighting to the horizontal counter value and the vertical counter value, the up-and-down and right-and-left weighting section 22 performs up-and-down and right-to-left weighting commonly to the G pixel, the R pixel, and the B pixel in the case of the state as is. Furthermore, when the degrees of the up-and-down and right-to-left unbalance of the G pixel, the R pixel, and the B pixel are the same, the up-and-down and right-and-left weighting section 22 performs weighting so that the up-and-down and right-to-left balance is achieved.

However, when the degrees of the up-and-down and right-to-left unbalance of the G pixel, the R pixel, and the B pixel differ from one another, even if a common up-and-down and right-to-left weighting process is performed, unbalance for each color cannot be corrected.

Figure 4:
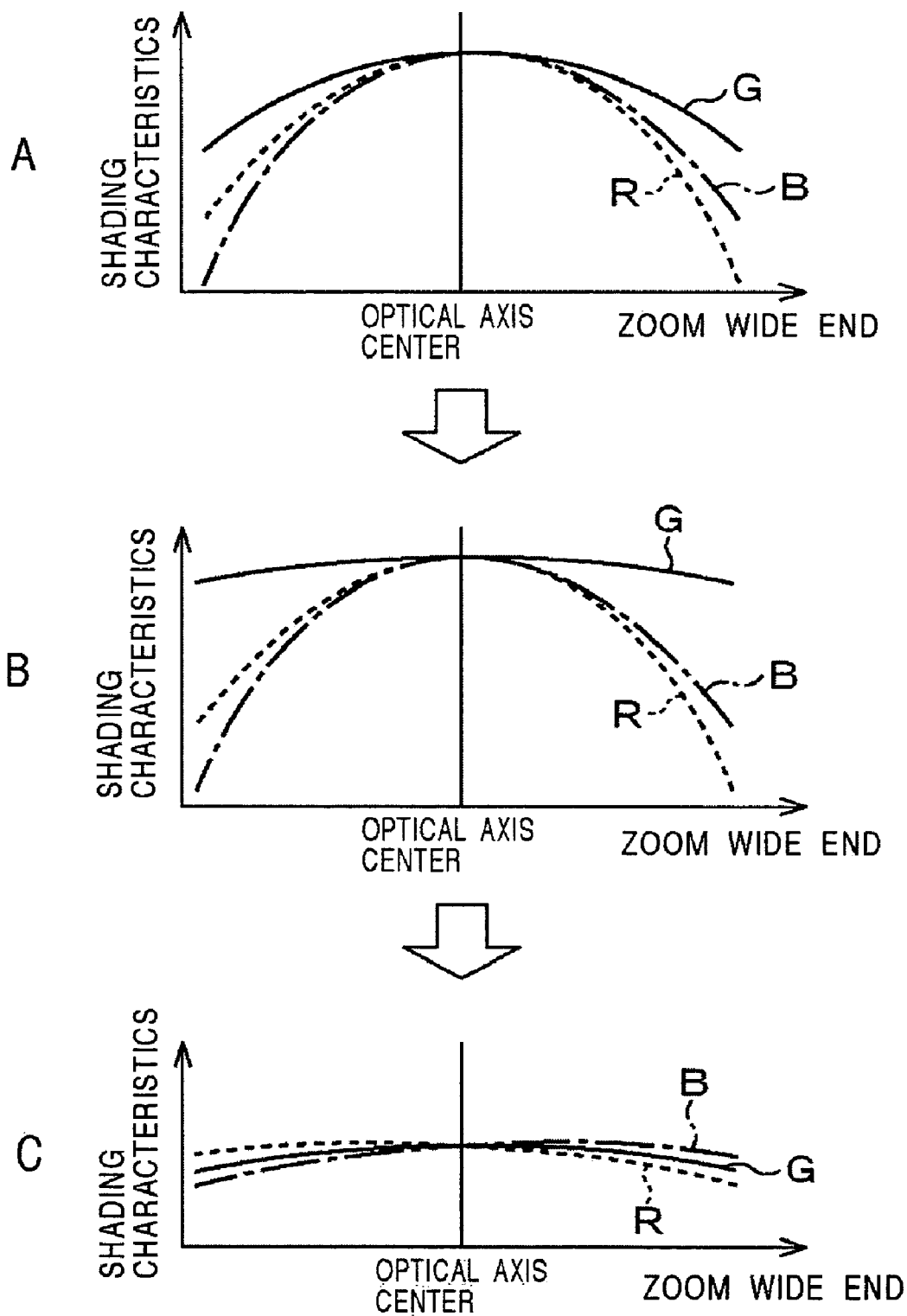
FIG. 4 shows a state in which an image whose right-to-left balance is degraded at a degree which is different for each color due to color shading is subjected to shading correction.

Referring now to FIG. 4, a description will be given of an example of a case where the degrees of the up-and-down and right-to-left unbalance of the G pixel, the R pixel, and the B pixel differ from one another.

Parts A to C of FIG. 4 show states in which an image whose right-to-left balance is degraded at a degree which is different for each color due to color shading is subjected to shading correction. In FIG. 4, the vertical axis indicates shading characteristics, and the horizontal axis indicates the position at the zoom wide end.

Part A of FIG. 4 shows a waveform in which single shading which differs for each of RGB occurs, and right-to-left balance is degraded at a degree which is different for each color. In this state, a state in which, for example, the G pixel is taken note of, and the up-and-down and right-and-left weighting section 22 performs right-to-left weighting in accordance with the G pixel, and the gain adjustment section 28 multiplies a correction gain is shown in Part B of FIG. 4. Here, weighting and a correction gain are not yet performed to the R pixel and the B pixel.

Part C of FIG. 4 shows that, since the R pixel and the B pixel are in the state of single shading, the single shading is not removed even if the up-and-down and right-and-left weighting section 22 performs right-to-left weighting in accordance with the G pixel, or the gain adjustment section 28 makes a correction by a color-by-color gain.

The reason for this is that, after the up-and-down and right-and-left weighting section 22 performs right-to-left weighting in accordance with the G pixel, the gain adjustment section 28 uniformly multiplies a color-by-color gain with respect to the up-and-down and right-to-left of the image plane. That is, if a gain is multiplied while being kept in the state of single shading, in the case of the single shading upward from left to right, the single shading remains while the left-side shading is not corrected, and in the case of the single shading upward from right to left, the single shading remains while the right-side shading is not corrected.

In the case of an image whose up-and-down balance is degraded at a degree which is different for each color, also, in the manner described above, shading cannot be corrected similarly to the case of an image whose right-to-left balance is degraded at a degree which is different for each color.

Therefore, in order to correct that the right-to-left or up-and-down balance is degraded at a degree which is different for each color due to color shading, the distance balance processing section 41 is provided inside the distance computation section 23 of FIG. 3.

Figure 5:
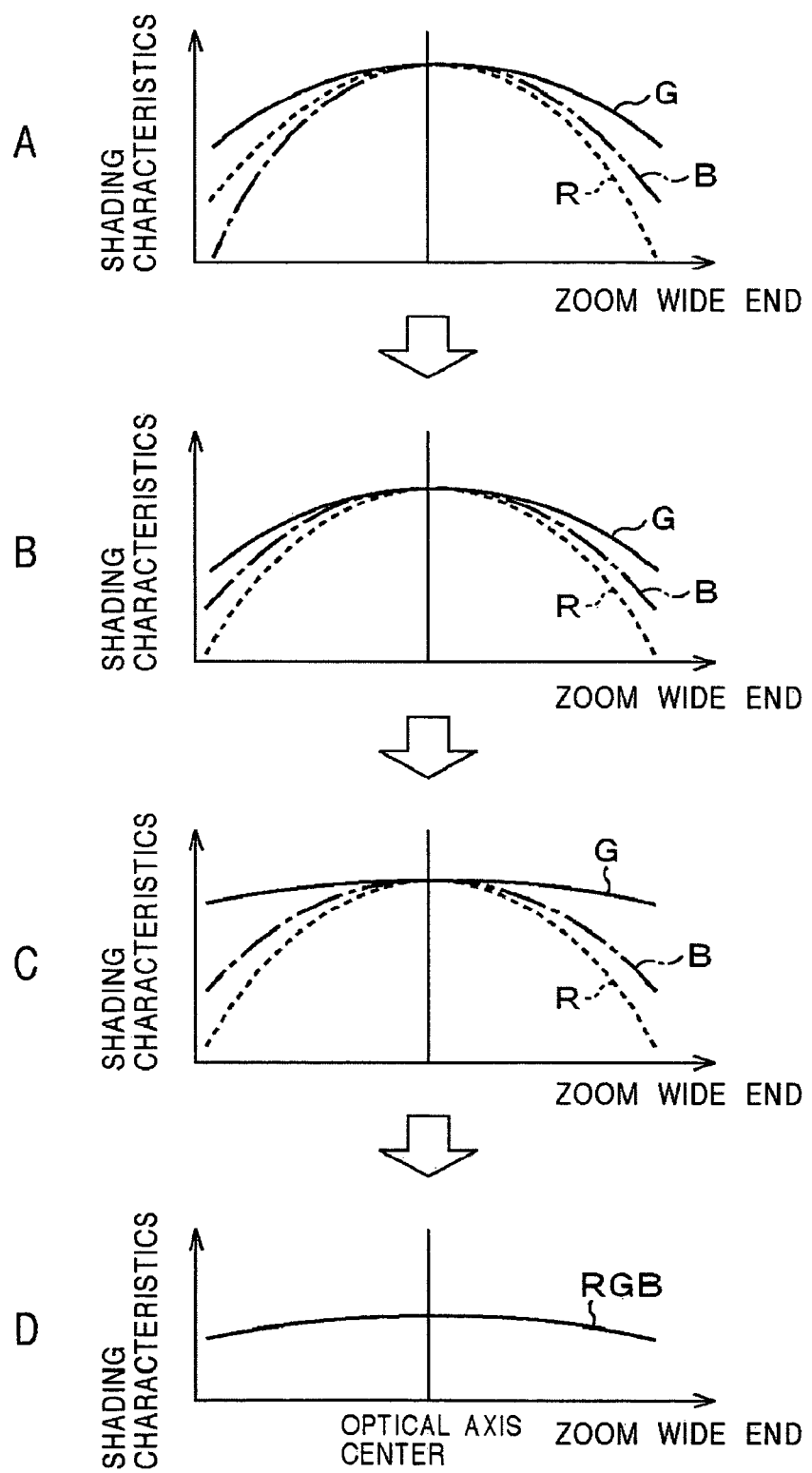
FIG. 5 shows a state in which an image whose right-to-left balance is degraded at a degree different for each color due to color shading is corrected by performing color shading balance.

Referring now to FIG. 5, a description will be given below of an example of a case where the degradation of right-to-left or up-and-down balance at a degree which is different for each color due to color shading is corrected.

Parts A to D of FIG. 5 show states in which an image whose right-to-left or up-and-down balance is degraded at a degree which is different for each color due to color shading is corrected by performing color shading balance. In FIG. 5, the vertical axis indicates shading characteristics, and the horizontal axis indicates the position at the zoom wide end.

Part A of FIG. 5 shows a waveform in which single shading which differs for each of RGB occurs, and right-to-left balance is degraded at a degree which is different for each color. In this state, for example, the G pixel is taken note of, and the up-and-down and right-and-left weighting section 22 performs weighting of up-and-down and right-to-left distances in accordance with the G pixel. That is, the up-and-down and right-and-left weighting section 22 multiplies the horizontal or vertical counter value by a gain corresponding to the up-and-down and right-to-left distance from the optical-axis center, the gain being used as a weight, in accordance with the shading of the G pixel. Thereafter, the distance balance processing section 41 performs a distance balance process for achieving balance of the distance for the G pixel on each of the R pixel and the B pixel. That is, the distance balance processing section 41 achieves balance of the length of the distance from the optical-axis center on the left side and the length of the distance from the optical-axis center on the right side by dividing into the R pixel and the B pixel. The same applies to the upper side and the lower side.

The result is shown in part B of FIG. 5. Each single shading of the R pixel and the B pixel is removed by the distance balance process. This makes it possible to converge the intensity of the correction gain and to obtain a flat level in which the correction result is the same as that of the G pixel.

Figure 6:
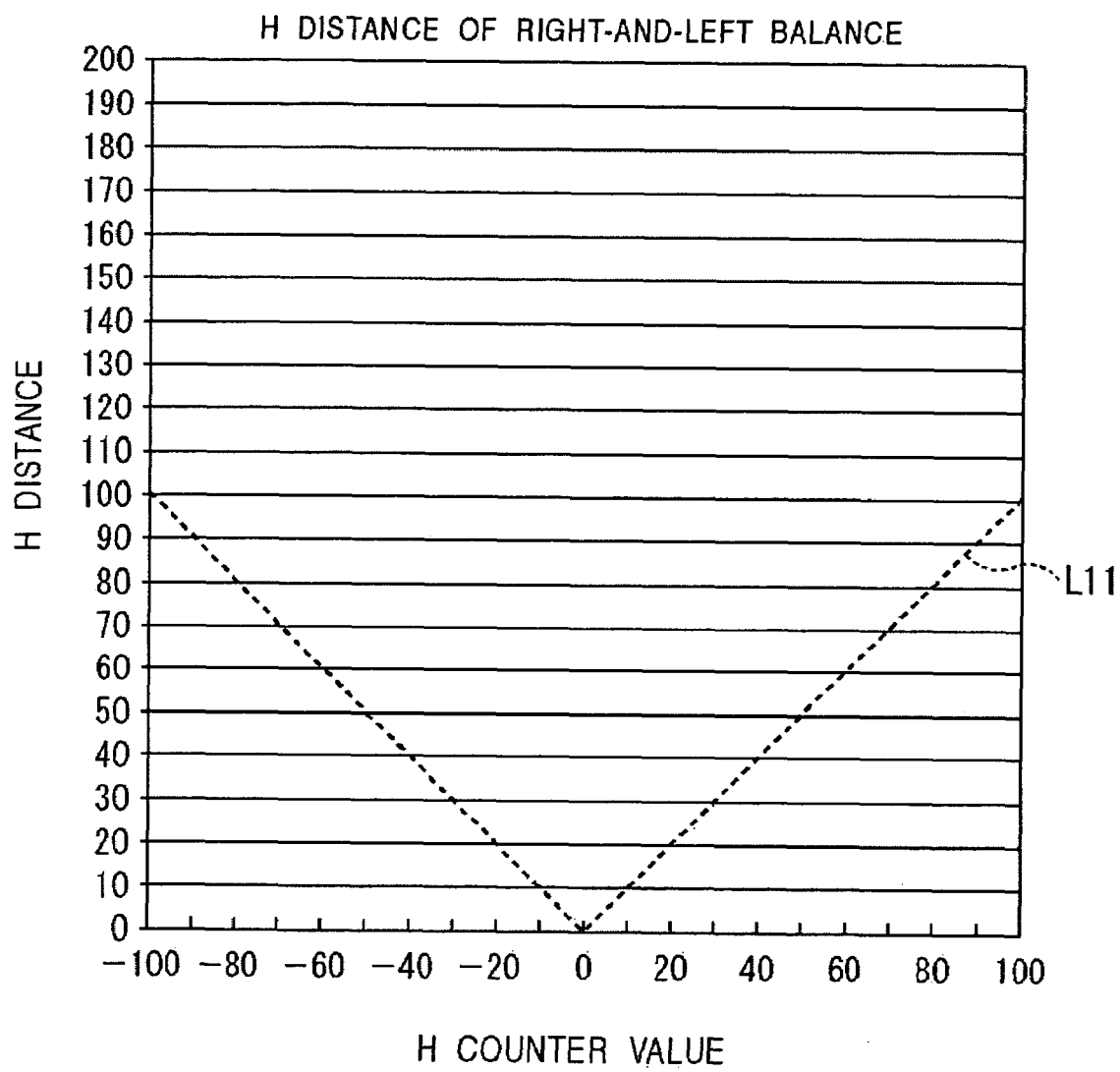
FIG. 6 shows a default H distance of right-to-left balance in the computation of the distance from the optical axis center.

FIG. 6 shows a default H distance of right-to-left balance (the right-to-left distance gain is 1×) in the computation of the distance from the optical-axis center. In FIG. 6, the vertical axis indicates the H distance of right-to-left balance, and the horizontal axis indicates the H counter value. The H counter value is calculated in such a manner that the horizontal counter value supplied from the signal generator 11 is obtained, the optical-axis center takes a value of zero, the left side takes a negative value, and the right side takes a positive value. In the default, the absolute value of the H counter value becomes the H distance (the default distance L11) as is (in the case where the right-to-left distance gain is 1×). In this manner, the distance balance processing section 41 corrects the reduction of the amount of peripheral light in accordance with the H distance.

A description will now be given below of a basic method of adjusting a right-to-left distance balance. Here, an example of a balance distance in a case where, as names of variables, Default_dist is set as the default distance, and BAL_dist is set as a balance distance (distance for adjusting unbalance) is shown in the following equations (1) and (2). It is assumed here that equation (1) is used for a case in which the H distance is negative, equation (2) is used for a case in which the H distance is positive, and the coefficient is from 0.0 to 1.998046875 (u,1,9).

$$BAL\_dist = Default\_dist \times coefficient \quad (1)$$

$$BAL\_dist = 2.0 \times Default\_dist - (Default\_dist \times coefficient) \quad (2)$$

Of course, in addition to the above-described equations, other equations of calculating the balance distance can be used as long as they satisfy the achievement of the distance balance.

Figure 7:
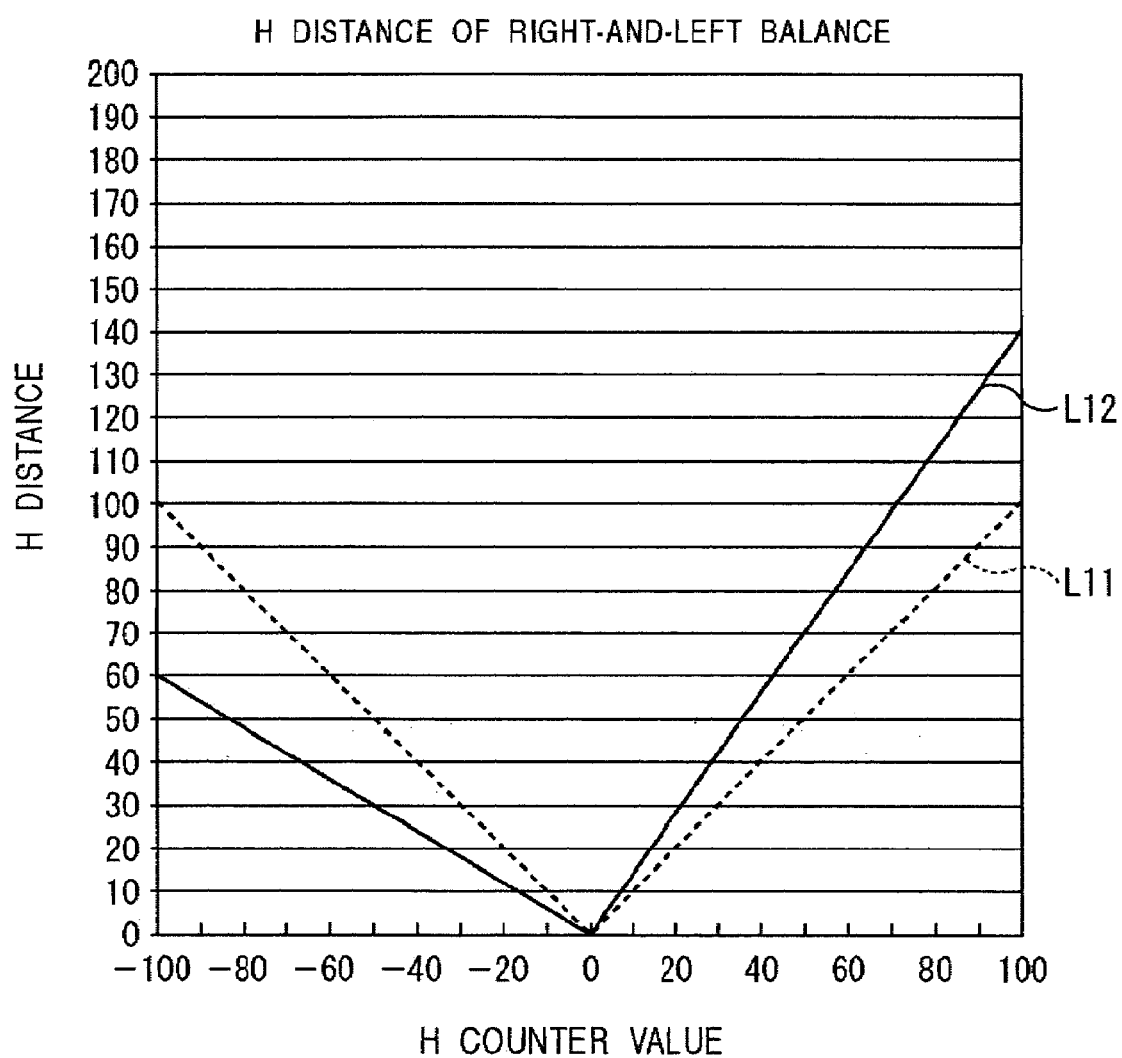
FIG. 7 shows an unbalance H distance upward from right to the left.
Figure 8:
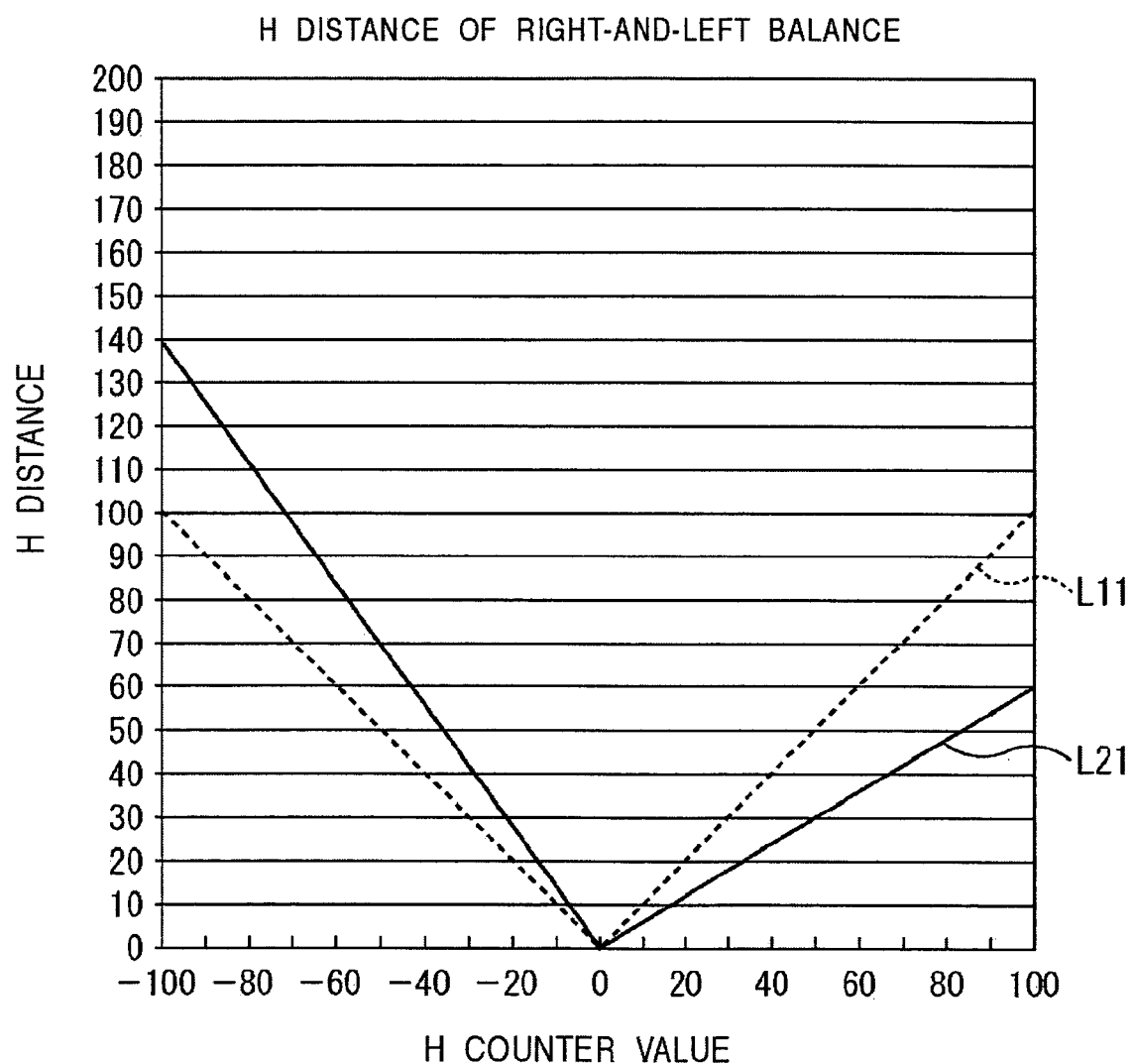
FIG. 8 shows an unbalance H distance upward from left to the right.

Furthermore, as shown in FIG. 7, in the case of an unbalance H distance upward from right to left (a balance distance L12 in the case of an example of FIG. 7), the distance balance is achieved so that, since the distance on the left side is shorter, the distance on the right side is increased correspondingly. Furthermore, as shown in FIG. 8, in the case of an unbalance H distance (a balance distance L21 in the case of an example of FIG. 8) upward from left to right, the distance balance is achieved so that, since the distance on the left side is longer, the distance on the right side is decreased correspondingly.

In this manner, as a result of adjusting the color-by-color unbalance before the shading correction operation is performed, if a color-by-color gain in which the gain is uniform is adjusted, it is possible to make the waveform to become closer to a flat waveform. Part C of FIG. 5 shows a state in which, as shown in part B of FIG. 5, after the unbalance is adjusted color by color, the up-and-down and right-and-left weighting section 22 performs right-to-left weighting in accordance with the G pixel, and the gain adjustment section 28 multiplies a correction gain. Part D of FIG. 5 shows a state in which, after the up-and-down and right-and-left weighting section 22 performs right-to-left weighting in accordance with the G pixel with respect to the R pixel and the B pixel, the gain adjustment section 28 adjusts the gain in accordance with the G pixel by a color-by-color gain.

The above processing makes it possible to solve color shading in which the right-to-left balance is degraded at a degree different for each color.

In the foregoing, a description is given of three-color data of green, red, and blue. The present invention can also be applied to four-color data of Gr/R/B/Gb, E/R/B/G, etc. In this case, taking note of the Gb pixel or the G pixel, the up-and-down and right-and-left weighting section 22 multiplies the horizontal or vertical counter value by a gain corresponding to the distance from each of the up-and-down and right-to-left distance from the optical-axis center in accordance with the shading of the Gb pixel or the G pixel, the gain being used as a weight.

Thereafter, the distance balance processing section 41 performs a distance balance process for achieving balance of the distance for the Gb pixel or the G pixel with respect to each of the Gr pixel, the R pixel, and the B pixel, or each of the E pixel, the R pixel, and the B pixel. That is, the balance of the length of the distance from the optical-axis center on the left side and the length of the distance from the optical-axis center on the right side is achieved. The same applies to the upper side and the lower side.

In the manner described above, regarding the four-color data of Gr/R/B/Gb, E/R/B/G, etc., color shading in which right-to-left balance is degraded at a degree different for each color can be solved.

A pseudo-distance computation section 42 of the distance computation section 23 is formed of a 16-sided polygon (hexadecagon) pseudo-distance calculation circuit for computing the distance d by an approximation using a polygon for the purpose of reducing the circuit scale. In the up-and-down and right-and-left weighting section 22, the weighting of the up-and-down and right-to-left distances is performed, and in the distance balance processing section 41, based on the data in which distance balance is achieved, the distance d to the optical-axis-center position is computed on the basis of the following equation (3). Here, the coordinates from the optical-axis center are denoted as (x, y), and the absolute values thereof are denoted as X and Y.

$$d=(X+Y)+\tfrac{3}{16}|X-Y|+\tfrac{2}{16}\{|X-2Y|+|2X+Y|\} \qquad (3)$$

The details of the hexadecagon pseudo-distance calculation are disclosed in Japanese Unexamined Patent Application Publication Nos. 2002-216136 and 2002-237998.

If the hexadecagon pseudo-distance calculation is simply calculated, a nearly regular 16-sided polygon is formed. However, here, since weights of up-and-down and right-to-left distances are multiplied, it is not always that the shape is formed closer to a regular 16-sided polygon.

In the look-up tables 24 and 25, for example, a correction coefficient table for correcting, for example, the reduction of the amount of peripheral light at the zoom wide end and a correction coefficient table for correcting, for example, the reduction of the amount of peripheral light at the zoom tele end are generated in advance and stored. The look-up tables 24 and 25 obtain a correction coefficient at the zoom wide end and a correction coefficient at the zoom tele end, which correspond to the distance data to the optical-axis-center position, which is computed by the distance computation section 23, and supply the correction coefficients to the gain blend processing section 27.

In the look-up tables 24 and 25, two correction coefficients for the zoom wide end and for the zoom tele end are stored. In addition, for example, two correction coefficients in which the aperture stop is open and the aperture stop is closed may be stored. Furthermore, two correction coefficients between the minimum side and the maximum side of the focus position, the image height, the exit pupil position, and the amount of strobe light emission may be stored.

The blend ratio setting section 26 sets the mixture (blend) ratio of two correction coefficients (the correction coefficient at the zoom wide end and the correction coefficient at the zoom tele end) according to each zoom position between the zoom wide end and the zoom tele end. More specifically, when the mixture ratio is set to 0, only the correction coefficient obtained from one of the look-up tables 24 and 25 (for example, the look-up table 24) is used. Then, as the value of the mixture ratio is set to be greater, the ratio of the correction coefficient obtained from the other table (for example, the look-up table 25) becomes greater.

Furthermore, the blend ratio setting section 26 sets the mixture ratio of two correction coefficients according to a predetermined position between the minimum side and the maximum side of the aperture stop value, the focus position, the image height, the exit pupil position, or the amount of strobe light emission.

When the two correction coefficients which are read from the look-up tables 24 and 25 correspondingly are, for example, subjected to shading correction at the zoom position, the gain blend processing section 27 mixes them at a mixture ratio determined by the blend ratio setting section 26 according to the zoom position in order to compute the shading correction coefficient. Furthermore, when shading is to be corrected, for example, by one of the aperture stop value of the image-capturing lens, the focus position, the image height, the exit pupil position, or the amount of strobe light emission, the gain blend processing section 27 mixes two correction coefficients read from the look-up tables 24 and 25 correspondingly at a mixture ratio determined according to a predetermined position between the minimum side and the maximum side in order to compute the shading correction coefficient.

For example, when the correction coefficient read from the look-up table 24 is denoted as A, the correction coefficient read from the look-up table 25 is denoted as B, and the mixture ratio set by the blend ratio setting section 26 is denoted as R, the blended shading correction coefficient C is computed on the basis of the following equation (4).

$$\begin{aligned} C &= (1-R)\cdot A + R\cdot B \\ &= A - R\cdot A + R\cdot B \\ &= A - R\cdot(A-B) \end{aligned} \qquad (4)$$

The gain adjustment section 28 identifies a color information signal of Gr/R/B/Gb, G/R/B/E, etc., and multiplies the shading correction coefficient blended at the gain blend processing section 27 by a color-by-color gain for each of the four colors. This color-by-color gain also serves the function of the degree of influence of shading correction, and the degree of influence of correction means that the intensity of correction is set for each photo-taking scene.

Based on the shading correction coefficient which is gain adjusted at the gain adjustment section 28, the correction section 29 corrects the reduction of the amount of peripheral light according to the distance to the optical-axis-center position with respect to the signal of each pixel, which is supplied from the imaging section 3. This correction section 29 is generally formed of a multiplier for multiplying a correction coefficient, but may be an adder in a case where a correction is made by adding an offset.

The camera signal processing section 5 performs an interpolation process and a simultaneous process on an image signal whose shading is corrected at the correction section 29, and forms output image signals (Y/C signals) to be output to terminals 31 and 32.

Referring now to the flowchart in FIG. 9, a description will be given of a shading correction process performed by the digital still camera having an imaging system shown in FIG. 3. In this process, a description is given of three-color data of green, red, and blue, but this process can also be applied to four-color data of Gr/R/B/Gb, E/R/B/G, etc., in a similar manner.

In step S1, the imaging device 2 reads the signal of each pixel at which an image is captured in accordance with the horizontal driving signal and the vertical driving signal generated at the timing generator 12. In step S2, based on the horizontal counter value and the vertical counter value generated at the signal generator 11, the optical-axis-center coordinate setting section 21 subtracts the value of ½ of the pixel length of the imaging device 2 from the horizontal counter value and subtracts the value of ½ of the line length from the vertical counter value in order to compute the optical-axis-center position information data.

In step S3, the up-and-down and right-and-left weighting section 22 multiplies the horizontal counter value by a horizontal distance gain on the right side or a horizontal distance gain on the left side, when viewed from the optical-axis-center position based on the optical-axis-center position information data computed in the process of step S2, the horizontal distance gain being used as a weight, and multiplies the vertical counter value by a vertical distance gain on the upper side or a vertical distance gain on the lower side, the gain being used as a weight.

In step S4, the up-and-down and right-and-left weighting section 22 determines whether or not the image is an image in which the right-to-left or up-and-down balance is degraded at a degree which is different for each color, that is, color shading has occurred. When it is determined that color shading has occurred, the process proceeds to step S5. In step S5, the up-and-down and right-and-left weighting section 22 performs a distance computation process for computing the distance from the image-plane center to each pixel by multiplying the distance by a distance gain by dividing into the upper side, the lower side, the left side, and the right side of the image plane in accordance with the green pixel. In step S6, the distance balance processing section 41 of the distance computation section 23 performs a red distance balance computation for multiplying the distance gain in which the green pixel is used as a reference by up-and-down and right-to-left balance gains of the red pixel, and a blue distance balance computation for multiplying the distance gain in which the green pixel is used as a reference by up-and-down and right-to-left balance gains of the blue pixel.

After the process of step S6, or when it is determined in step S4 that color shading has not occurred, the process proceeds to step S7. In this step, based on the data to which weights of up-and-down and right-to-left distances are assigned in the process of step S3 and based on the data in which distance balance is achieved when the processing of steps S5 and S6 is completed, the pseudo-distance computation section 42 of the distance computation section 23 computes the distance d to the optical-axis-center position on the basis of equation (3) described above.

As a result of the processing up to this point, for each pixel read from the imaging device 2, the horizontal counter value and the vertical counter value, corresponding to the pixel, is supplied from the signal generator 11 via the optical-axis-center coordinate setting section 21 and the up-and-down and right-and-left weighting section 22 to the distance computation section 23, whereby the distance to the optical-axis-center position is computed.

In step S8, the look-up tables 24 and 25 obtain the correction coefficient for the zoom wide end and the correction coefficient for the zoom tele end, which correspond to the distance to the optical-axis-center position for each pixel, the distance being computed in the process of step S7, respectively. In step S9, the blend ratio setting section 26 sets the mixture ratio of two correction coefficients obtained in the process of step S8 in accordance with each zoom position between the zoom wide end and the zoom tele end. In step S10, based on the equation (4) described above, the gain blend processing section 27 mixes the correction coefficient for the zoom wide end and the correction coefficient for the zoom tele end, obtained in the process of step S8, at a predetermined mixture ratio set in the process of step S9, in order to compute the shading correction coefficient C.

As a result of processing up to this point, even if shading characteristics differ greatly at both ends of the wide end and the tele end of the zoom position of the image-capturing lens, by mixing the two types of correction coefficients of the two ends at a mixture ratio which is determined according to a predetermined zoom position between the wide end and the tele end, the shading correction coefficient can be easily computed without degrading the correction accuracy.

Similarly, even if the shading characteristics differ greatly between two ends of the aperture stop value, the focus position, the image height, the exit pupil position, and the amount of strobe light emission on the minimum side and those on the maximum side, by mixing the correction coefficients at the two ends at a mixture ratio determined according to a predetermined position between the minimum side and the maximum side, also, the shading correction coefficient can easily be computed without degrading the correction accuracy.

In step S11, the gain adjustment section 28 multiplies the shading correction coefficient computed in the process of step S10 by a color-by-color gain for each of the three colors. In step S12, the correction section 29 makes a correction of, for example, the reduction of the amount of peripheral light corresponding to the distance to the optical-axis-center position with respect to the signal of each pixel read from the imaging device 2 in the process of step S1 on the basis of the shading correction coefficient which is gain adjusted in the process of step S11.

As described above, even if the shading characteristics are inclined to the up-and-down or right-to-left of the image plane, by performing up-and-down and right-to-left weighting of the distance from optical-axis-center position, the up-and-down and right-to-left balance of the image signal is achieved, the distance is computed using equation (3) which is approximated by a polygon, and the correction coefficients corresponding to the computed distance values are obtained from the two look-up tables 24 and 25, correspondingly. Then, the two obtained correction coefficients are blended at the mixture ratio which is determined according to a predetermined position between two ends, that is, the wide end and the tele end of the zoom position of the image-capturing lens, thus computing the target shading correction coefficient. As a result, even if the zoom position of the image-capturing lens is at any position between the wide end and the tele end, the shading correction coefficient can easily be computed without degrading the correction accuracy. Therefore, satisfactory lens shading correction can be performed with simple hardware configuration.

The look-up tables 24 and 25 are each formed of one block. In addition, for example, values corresponding to the three primary-color signals (R, G, B), a luminance signal (Y signal), or color-difference signals (Cb and Cr signals) may be stored.

In the foregoing, by reading two correction coefficients based on the distance to the optical-axis-center position, shading correction is performed in real time. In addition, when the image is thinned out in one of the vertical direction and the horizontal direction or in both directions, shading correction can similarly be performed in real time.

Figure 10:
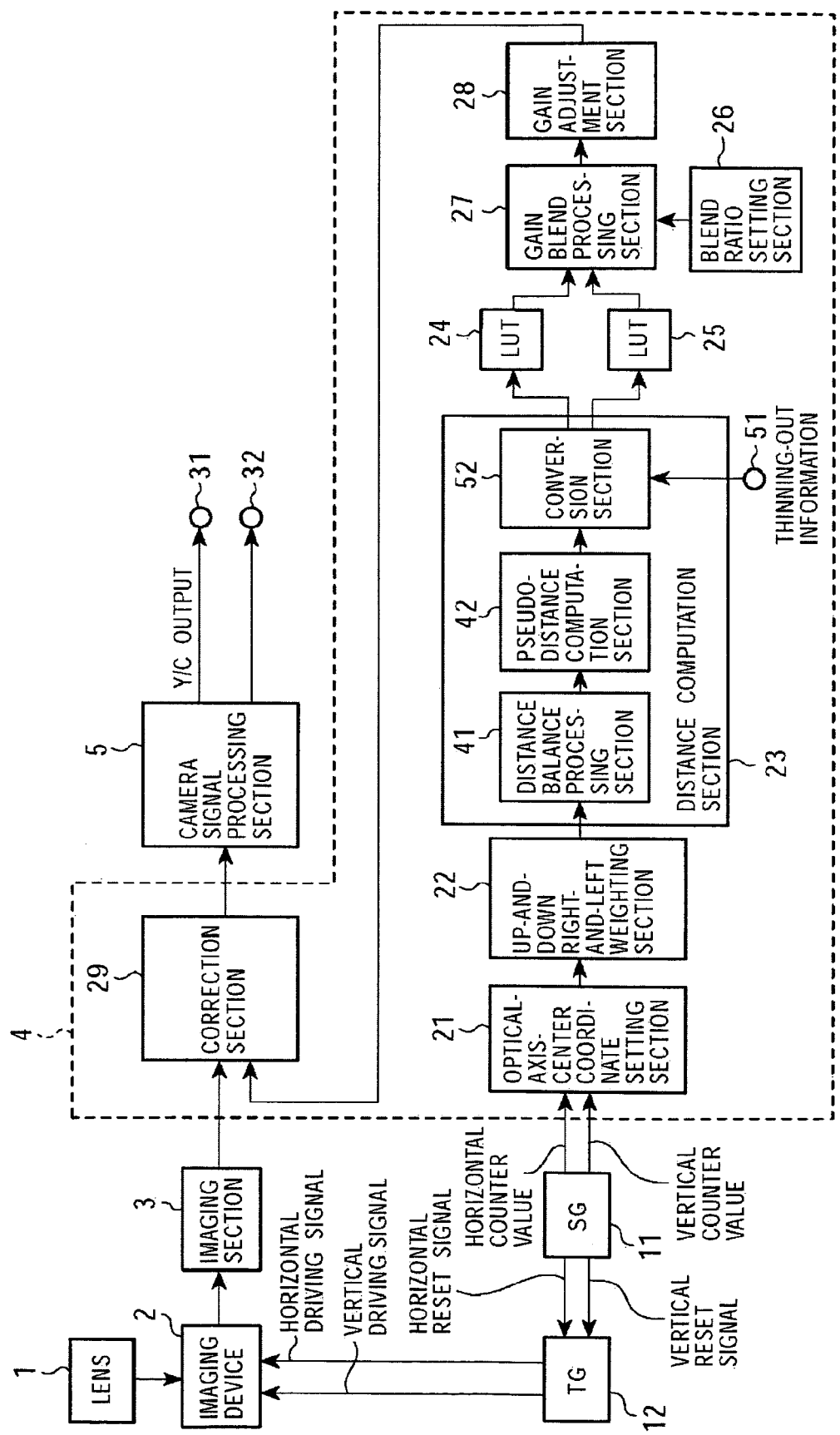
FIG. 10 shows another example of the configuration of an imaging system of a digital still camera.

FIG. 10 shows an example of the configuration of an imaging system of a digital still camera provided with a function for correcting reduction of the amount of peripheral light in real time by reading a correction table based on the direction to the optical-axis-center position in a case where an image is thinned out in one of the vertical direction and the horizontal direction or in both directions. Components in FIG. 10, which correspond to those of FIG. 3, are designated with the corresponding reference numerals, and descriptions thereof are omitted where appropriate. The case of the configuration shown in FIG. 10 is identical to that of FIG. 3 except that a conversion section 52 is newly provided inside the distance computation section 23.

The distance computation section 23 computed the distance d to the optical-axis-center position on the basis of equation (3) described above from the data in which weighting of up-and-down and right-to-left distances is performed at the up-and-down and right-and-left weighting section 22 and the distance balance is achieved at the distance balance processing section 41. Thereafter, the distance computation section 23 causes the conversion section 52 to convert the value of the distance d in accordance with the thinning-out information (the reciprocal of the thinning-out rate) supplied from a terminal 51.

Figure 11:
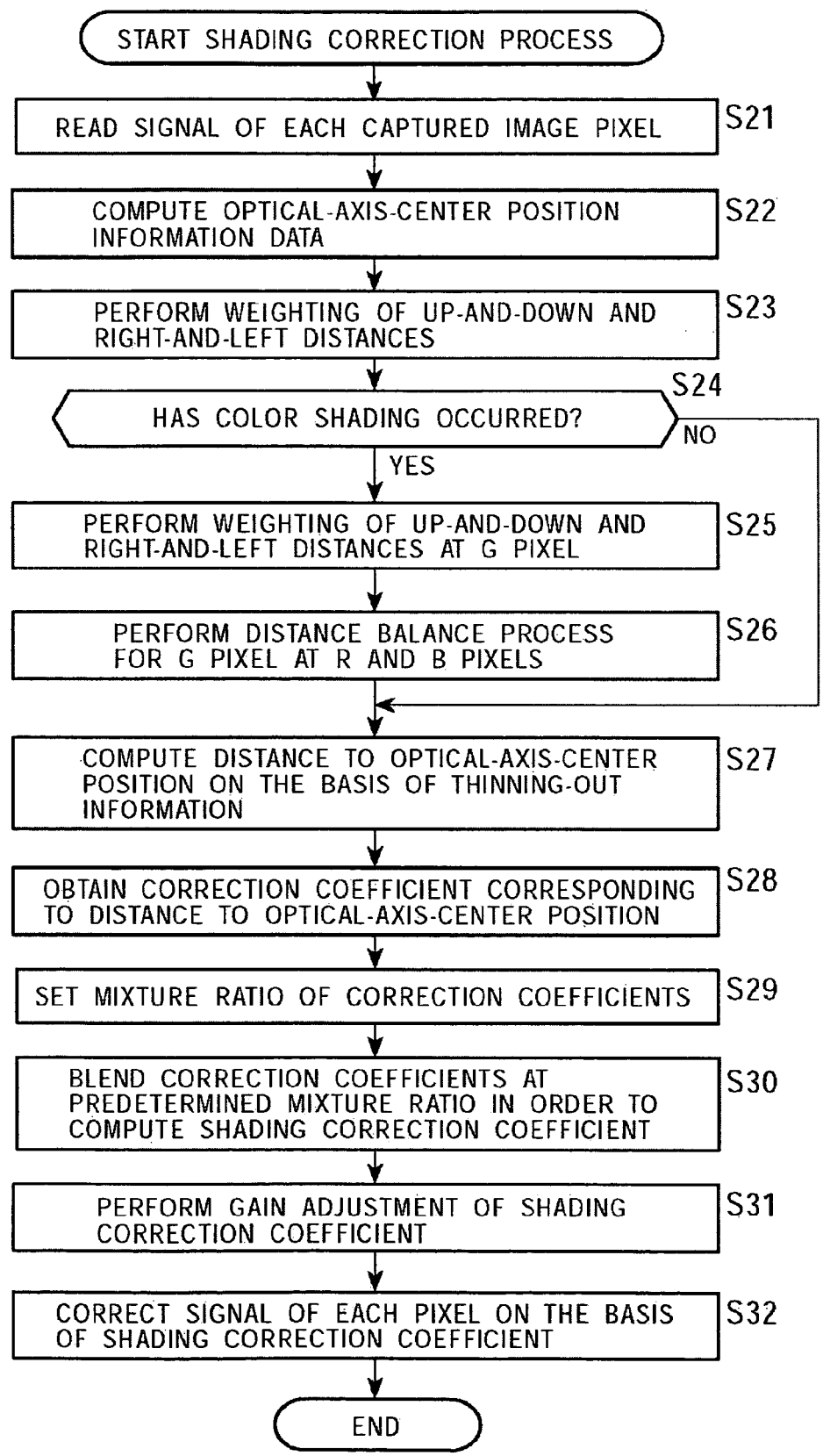
FIG. 11 is a flowchart illustrating a shading correction process performed by the digital still camera shown in FIG. 10.

Referring now to the flowchart in FIG. 11, a description is given of a shading correction process performed by the digital still camera having an imaging system shown in FIG. 10.

The processing of steps S21 to S26 is identical to the above-described processing of steps S1 to S6 of FIG. 9, and accordingly, a description thereof is omitted. That is, the signal of each pixel at which an image is captured is read, the optical-axis-center position information data is computed on the basis of the horizontal counter value and the vertical counter value corresponding to each pixel, weighting of up-and-down and right-to-left distances, when viewed from the optical-axis-center position, is performed, and distance balance is achieved when color shading has occurred.

In step S27, the distance computation section 23 computes the distance d to the optical-axis-center position on the basis of equation (3) described above from the data in which weighting of up-and-down and right-to-left distances is performed in the process of step S23 and the data in which distance balance is achieved when the processing of steps S25 and S26 is completed. The conversion section 52 converts the computed value of the distance d on the basis of the thinning-out information supplied from the terminal 51.

The processing of steps S28 to S31 is identical to the above-described processing of steps S9 to S12 of FIG. 9, and accordingly, a description thereof is omitted. That is, the correction coefficient for the zoom wide end and the correction coefficient for the zoom tele end are obtained on the basis of the distance to the optical-axis-center position for each pixel, which is converted in the process of step S27, and these coefficients are blended at a predetermined mixture ratio, thereby computing the shading correction coefficient. Then, the gain of the shading correction coefficient is adjusted, and based on the shading correction coefficient, correction of, for example, the reduction of the amount of peripheral light, corresponding to the distance to the optical-axis-center position, is made with respect to the read signal of each pixel.

As described above, even if the thinning-out of the image has been performed, the conversion section 52 converts the count value into a count value in the state in which thinning out is not performed, and the distance from the optical-axis-center position can be determined correctly. As a result, a satisfactory correction of, for example, lens shading, can be performed.

In the look-up tables 24 and 25 shown in FIGS. 3 and 10, a correction coefficient table for correcting, for example, the reduction of the amount of peripheral light at the zoom wide end and a correction coefficient table for correcting, for example, the reduction of the amount of peripheral light at the zoom tele end are prestored. Alternatively, for example, a correction coefficient for correcting, for example, the reduction of the amount of peripheral light can also be computed in accordance with the value of the distance to the optical-axis-center position.

Figure 12:
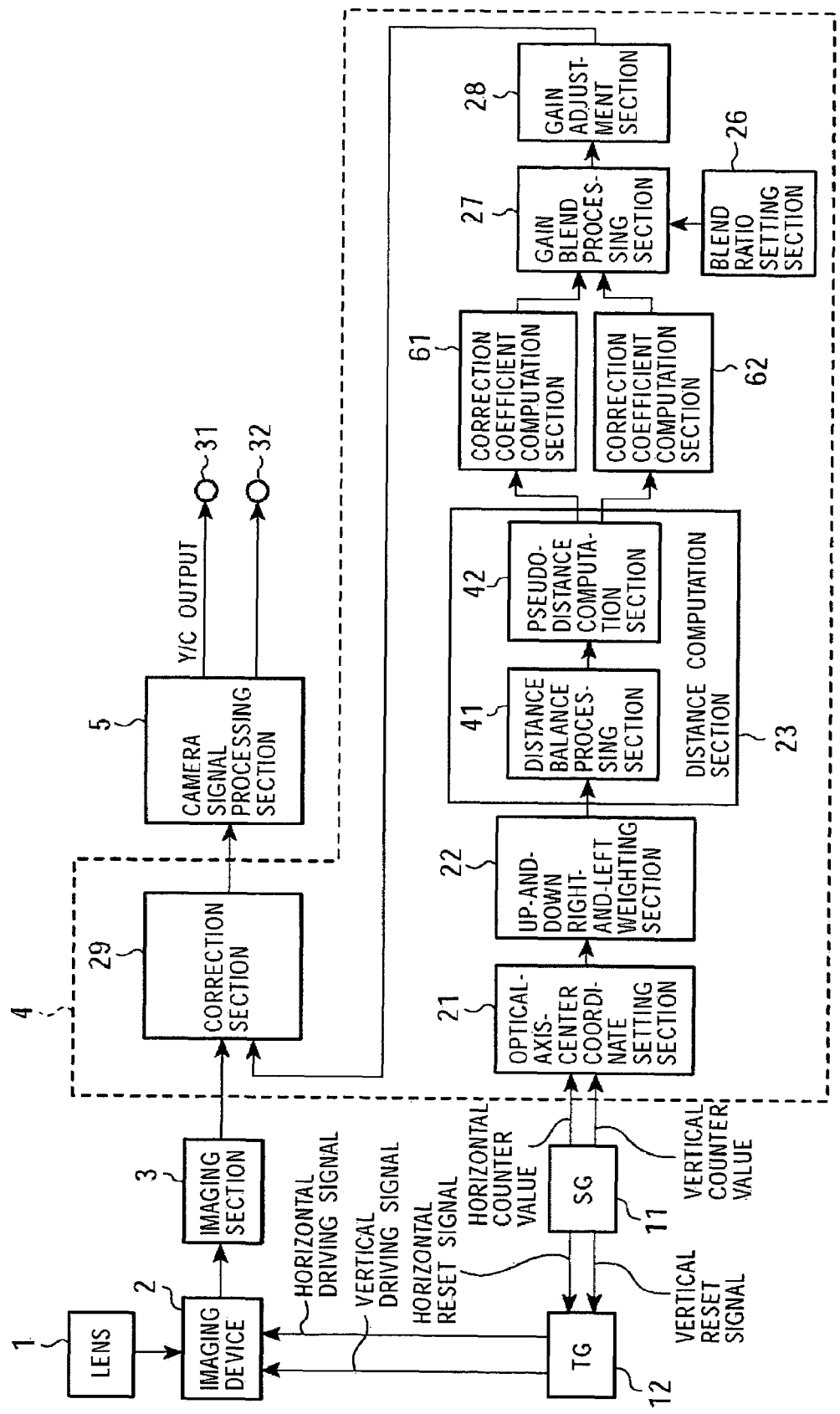
FIG. 12 shows another example of the configuration of an imaging system of a digital still camera.

FIG. 12 shows an example of the configuration of the imaging system of a digital still camera provided with a function for correcting, for example, the reduction of the amount of peripheral light in real time by computing a correction coefficient in accordance with the value of the distance to the optical-axis-center position. Components in FIG. 12, which correspond to those of FIG. 3, are designated with the corresponding reference numerals, and descriptions thereof are omitted where appropriate. The case of the configuration shown in FIG. 12 is identical to that of FIG. 3 except that correction function computation sections 61 and 62 are provided in place of the look-up tables 24 and 25.

The correction function computation sections 61 and 62 compute a correction coefficient for correcting, for example, the reduction of the amount of peripheral light at the zoom wide end and a correction coefficient for correcting, for example, the reduction of the amount of peripheral light at the zoom tele end, respectively, in accordance with the distance data to the optical-axis-center position computed by the distance computation section 23.

Figure 13:
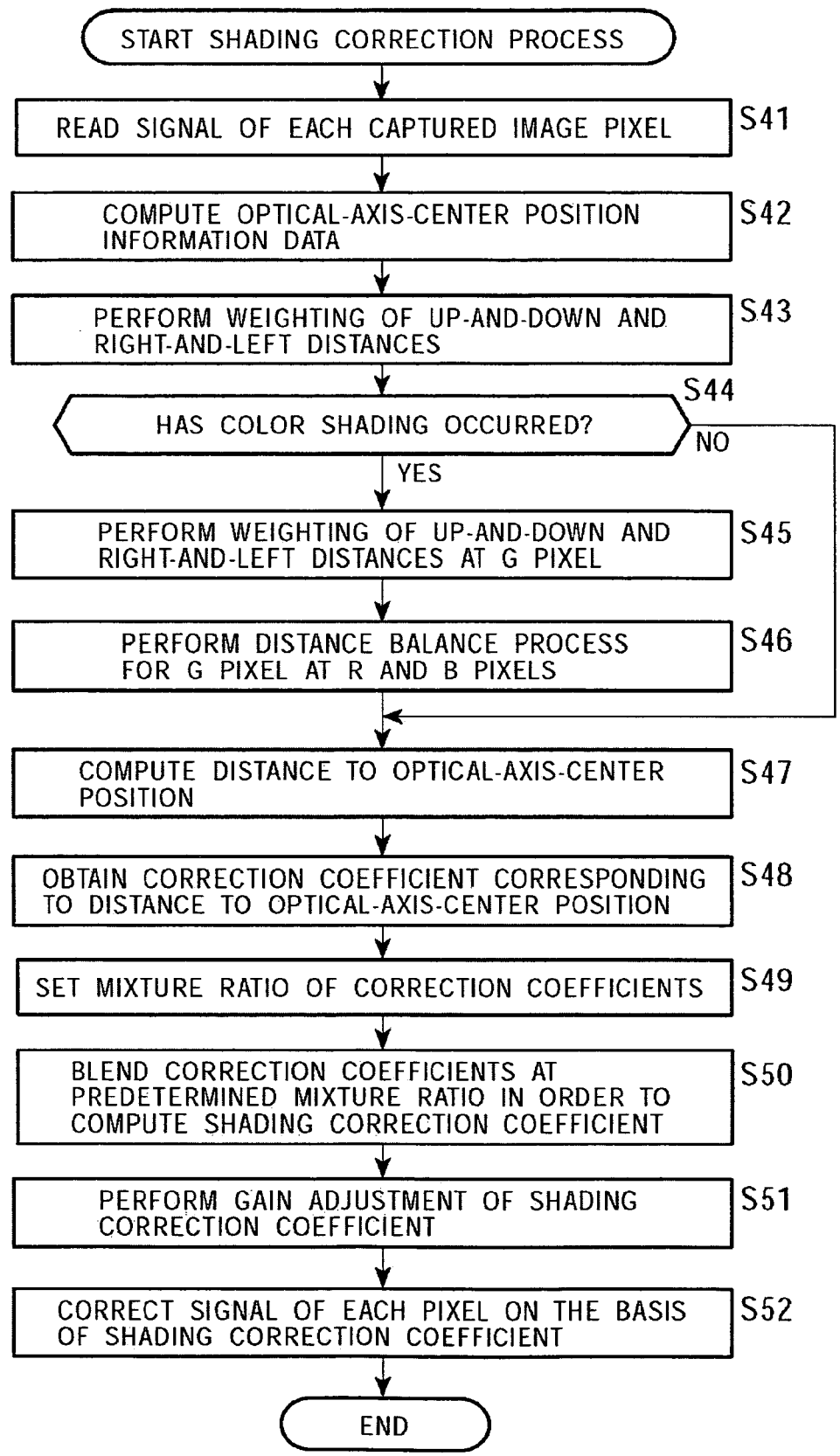
FIG. 13 is a flowchart illustrating a shading correction process performed by the digital still camera shown in FIG. 12.

Referring now to the flowchart in FIG. 13, a description is given of a shading correction process performed by the digital still camera having an imaging system shown in FIG. 12.

The processing of steps S41 to S47 is identical to the above-described processing of steps S1 to S7 of FIG. 9, and accordingly, a description thereof is omitted. That is, the signal of each pixel at which an image is captured is read, the optical-axis-center position information data is computed on the basis of the horizontal counter value and the vertical counter value corresponding to each pixel, weighting of up-and-down and right-to-left distances is performed, the distance balance is achieved when color shading has occurred, and the distance to the optical-axis-center position for each pixel is computed.

In step S48, the correction function computation sections 61 and 62 compute a correction coefficient for the zoom wide end and a correction coefficient for the zoom tele end, which correspond to the distance to the optical-axis-center position for each pixel, the distance being computed in the process of step S47.

The processing of steps S49 to S52 is identical to the above-described processing of steps S9 to S12 of FIG. 9, and accordingly, a description thereof is omitted. That is, as a result of the correction coefficient for the zoom wide end and the correction coefficient for the zoom tele end, which are computed in the process of step S48, being blended at a predetermined mixture ratio, the shading correction coefficient is computed. Then, the gain of the shading correction coefficient is adjusted, and based on the shading correction coefficient, a correction of, for example, the reduction of the amount of peripheral light, corresponding to the distance to the optical-axis-center position, is performed on the read signal of each pixel.

As described above, even if the correction coefficient table is not stored, the correction function computation sections 61 and 62 compute the correction coefficient for the zoom wide end and the correction coefficient for the zoom tele end, respectively. As a result, a satisfactory correction of, for example, lens shading can be made using the computed correction coefficients.

Figure 14:
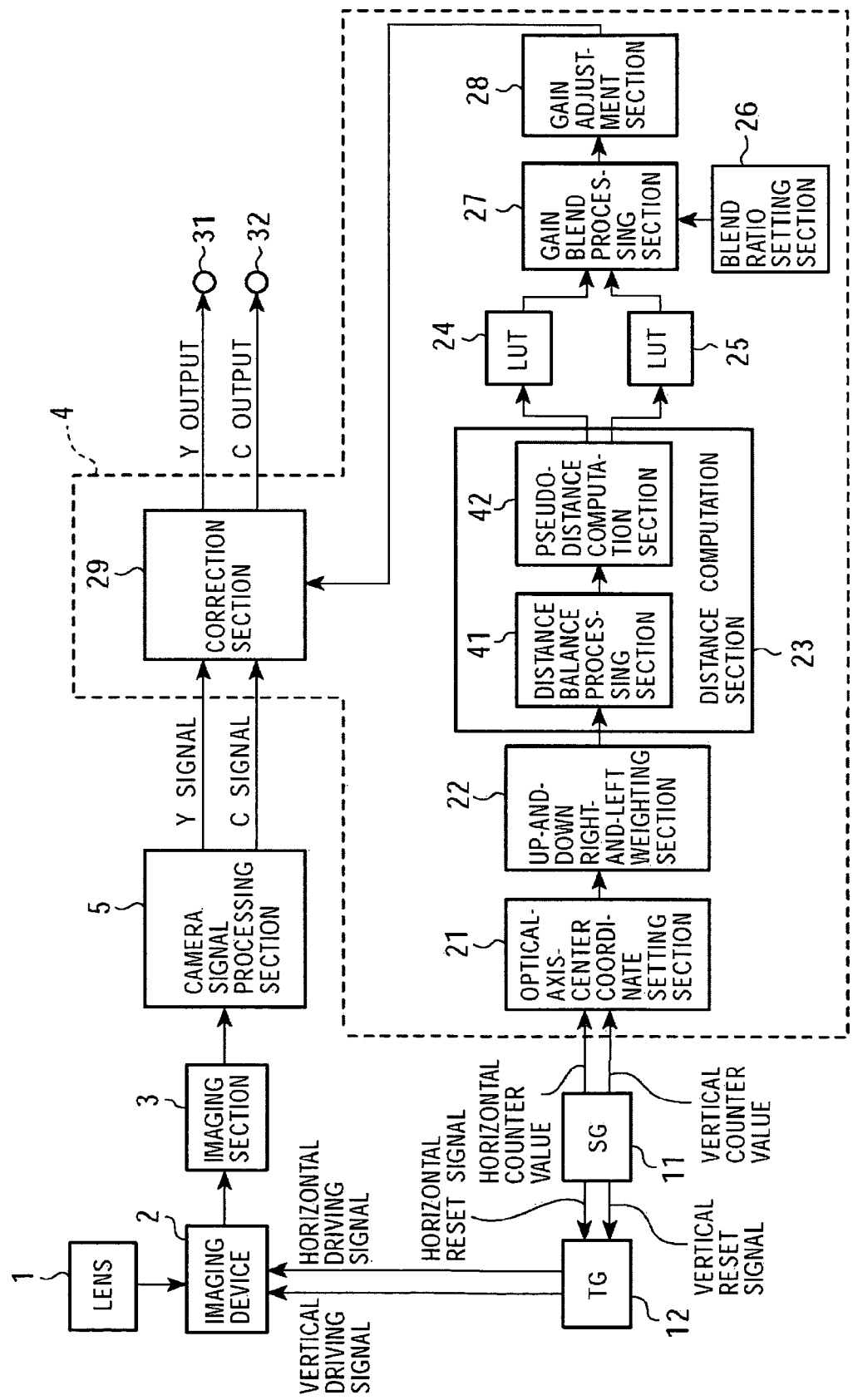
FIG. 14 shows another example of the configuration of an imaging system of a digital still camera.

In the foregoing, the shading correction section 4 is provided at a stage prior to the camera signal processing section 5. Alternatively, for example, as shown in FIG. 14, the shading correction section 4 may be provided at a stage subsequent to the camera signal processing section 5. In this case, shading correction is performed after the image signal is separated into a luminance signal (Y signal) and color-difference signals (Cb and Cr signals) in the camera signal processing section 5. Therefore, independent processing can be performed on the luminance signal and the color-difference signals, for example, the correction of the reduction of the amount of peripheral light is performed on the luminance signal and color blur correction is performed on the color-difference signals.

Figure 15:
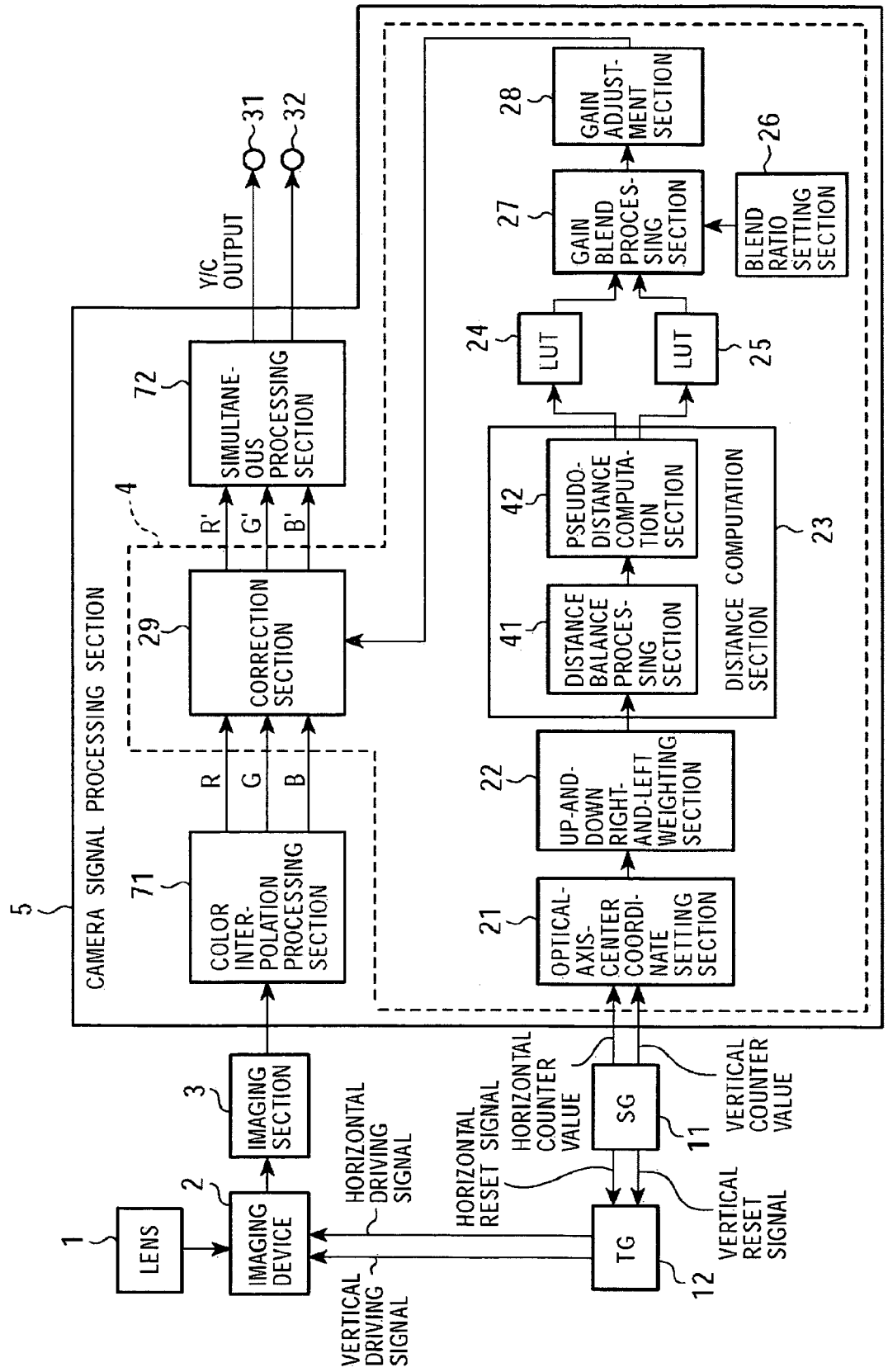
FIG. 15 shows another example of the configuration of an imaging system of a digital still camera.

The shading correction section 4 can also be provided at a stage subsequent to the color interpolation processing section 71 inside the camera signal processing section 5, as shown in, for example, FIG. 15. In this case, when the three primary-color signals (R, G, B) for all the pixels are collected by the interpolation process by the color interpolation processing section 71, a shading correction process is performed. Then, the three primary-color signals (R', G', B') on which the shading correction process is performed are processed so as to become simultaneous by the simultaneous processing section 72, and output image signals (Y/C signals) are formed.

Figure 16:
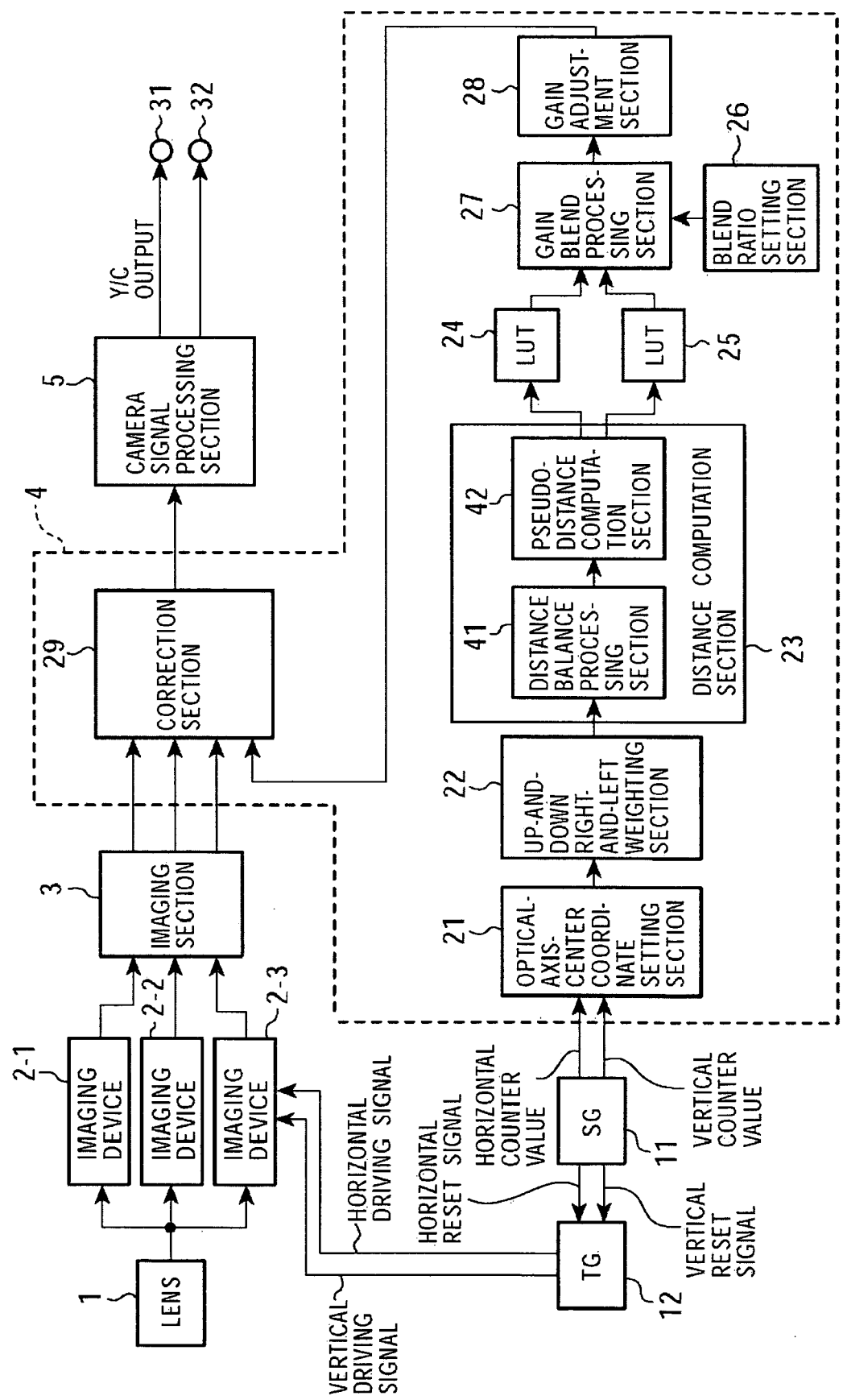
FIG. 16 shows another example of the configuration of an imaging system of a digital still camera.

Furthermore, as shown in FIG. 16, in the device provided with a plurality of imaging devices 2-1 to 2-3, a shading correction process may be performed for each signal of each pixel, which is read from each of the imaging devices 2-1 to 2-3.

In the foregoing, even if the shading characteristics are inclined either up and down or right to left of the image plane, up-and-down and right-to-left unbalance of the shading characteristics can be corrected with simple hardware configuration.

Regarding one of the zoom position of the image-capturing lens, the aperture stop value, the focus position, the image height, the exit pupil position, and the amount of strobe light emission, the shading characteristics curve greatly differs between the two ends on the minimum side and on the maximum side, by obtaining or computing two types of correction coefficients, that is, a correction coefficient on the minimum side and a correction coefficient on the maximum side and by computing a target shading correction coefficient by mixing those correction coefficients at a mixture ratio determined according to a predetermined position between the minimum side and the maximum side, the correction coefficient can easily be computed without degrading correction accuracy with simple hardware configuration.

In the foregoing, a description is given by using as an example a digital still camera for capturing a still image. Of course, by utilizing features such that computation of a distance in real time is possible, the present invention can also be applied to a digital video camera for capturing moving images.

As described above, although these series of processes can be performed by hardware, the processes can also be performed by software. In this case, for example, the digital still camera having an imaging system of FIGS. 3, 10, 12, and 14 to 16 is realized by a personal computer 100 shown in FIG. 17.

Figure 17:
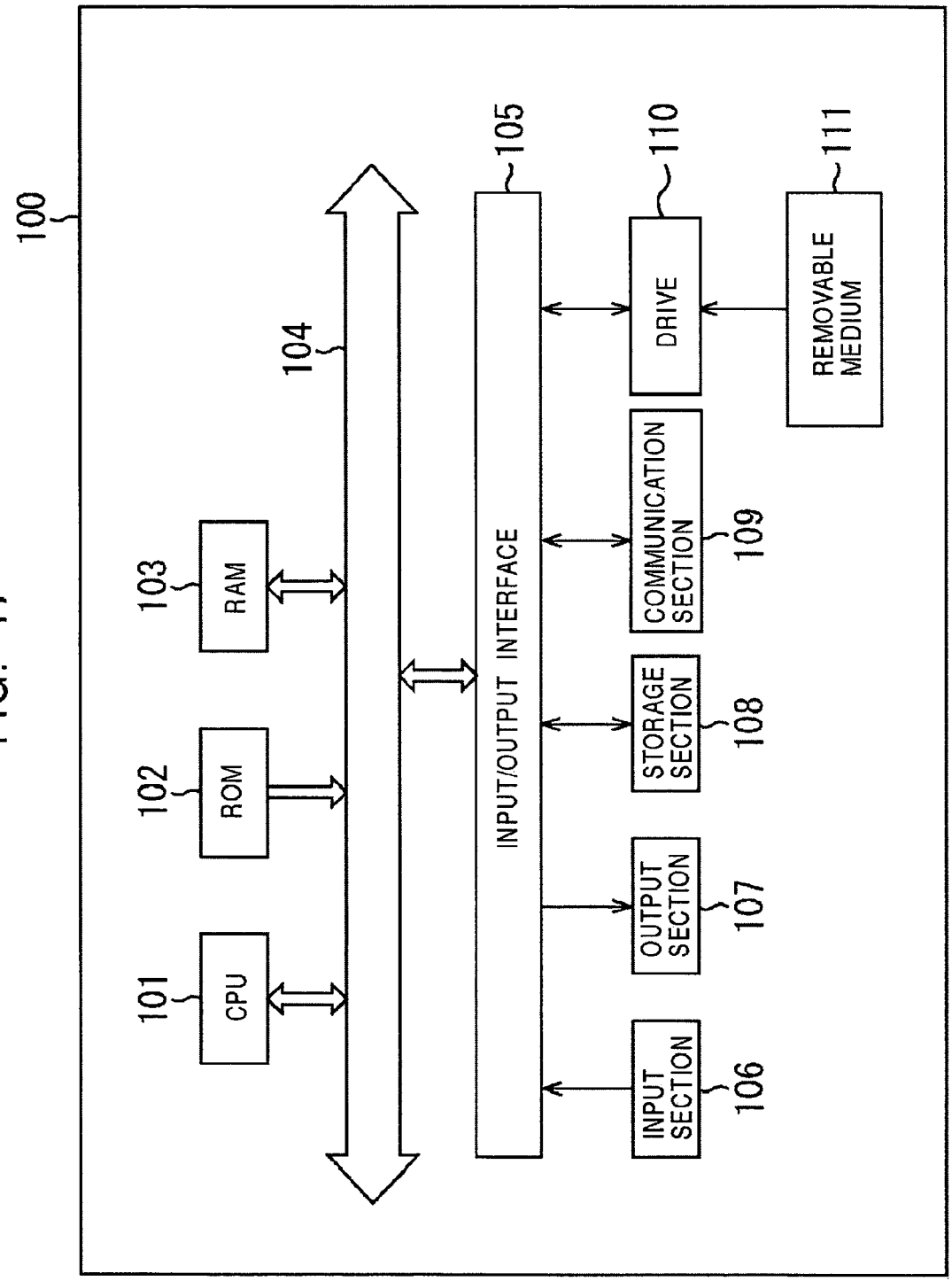
FIG. 17 is a block diagram showing an example of the configuration of a personal computer.

In FIG. 17, a CPU (Central Processing Unit) 101 executes various processing in accordance with a program stored in a ROM (Read Only Memory) 102 or a program loaded from a storage section 108 to a RAM (Random Access Memory) 103. In the RAM 103, furthermore, for example, data required for the CPU 101 to execute various processing is stored as appropriate.

The CPU 101, the ROM 102, and the RAM 103 are interconnected with one another via a bus 104. Also, an input/output interface 105 is connected to the bus 104.

Connected to the input/output interface 105 are an input section 106 including a keyboard, a mouse, etc.; an output section 107 including a display unit; the storage section 108; and a communication section 109. The communication section 109 performs a communication process via a network.

Also, a drive 110 is connected to the input/output interface 105 as required. A removable medium 111, such as a magnetic disk, an optical disk, a magneto-optical disk, or a semiconductor memory, is loaded into the drive 110 as necessary, and a computer program read therefrom is installed into the storage section 108 as necessary.

The recording medium for recording a computer-executable program, which is installed into the computer, is formed of a removable medium 111 composed of a magnetic disk (including a flexible disk), an optical disk (including a CD-ROM (Compact Disk-Read Only Memory) or a DVD (Digital Versatile Disk)), a magneto-optical disk (including an MD (Mini-Disk) (registered trademark)), or a semiconductor memory, the recording medium being distributed to provide a program to the user separately to the main unit of the device, as shown in FIG. 17. Furthermore, the recording medium is formed of the ROM 103, a hard disk contained in the storage section 108, in which a program is recorded, which are provided to the user by being preincorporated into the main unit of the device.

In this specification, the steps for writing the program stored in a recording medium may be executed chronologically according to the written orders. However, they do not have to be executed chronologically, and they may be executed concurrently or individually.

Furthermore, in this specification, the system designates the entire apparatus formed of a plurality of devices.

According to the present invention, shading can be corrected. In particular, shading can be corrected without increasing the circuit scale and the program scale and without degrading correction accuracy.

What is claimed is:

1. An image processing apparatus for correcting shading of a captured image, the image processing apparatus comprising:
   a first distance computation section configured to compute a first distance from an image-plane center to each pixel by multiplying a measured distance by a distance gain;
   an obtaining section configured to obtain a plurality of correction values for each pixel for correcting the shading of the image based on the first distance computed by the first distance computation section;
   a mixture-ratio setting section configured to set a mixture-ratio of the plurality of correction values for each pixel obtained by the obtaining section;
   a mixing section configured to mix the plurality of correction values for each pixel to determine a final correction value for each pixel, based on the mixture-ratio set by the mixture-ratio setting section; and
   a correction section configured to correct the signal of each pixel based on the final correction value determined by the mixing section.

2. The image processing apparatus according to claim 1, wherein the mixture-ratio setting section sets the mixture-ratio based on one or more of a lens zoom position, a focus position, an image height, an aperture stop value, an exit pupil position, and an amount of strobe light emission.

3. The image processing apparatus according to claim 1, further comprising a gain adjustment section configured to adjust a gain of the plurality of correction values obtained by the obtaining section.

4. The image processing apparatus according to claim 1, further comprising, when the captured image is composed of three colors of a G pixel, an R pixel, and a B pixel:
   a second distance computation section configured to compute a second distance from the image-plane center to each pixel by multiplying the measured distance by a distance gain in accordance with the G pixel;
   a first distance balance gain correction section configured to multiply the distance gain in which the G pixel is used as a reference by a distance balance gain of the R pixel; and
   a second distance balance gain correction section configured to multiply the distance gain in which the G pixel is used as a reference by a distance balance gain of the B pixel.

5. The image processing apparatus according to claim 1, further comprising, when the captured image is composed of four colors of a Gr pixel, an R pixel, a B pixel, and a Gb pixel, or four colors of an E pixel, an R pixel, a B pixel, and a G pixel:
- a second distance computation section configured to compute the second distance from the image-plane center to each pixel by multiplying the measured distance by a distance gain in accordance with the Gb pixel or the G pixel;
- a first balance gain correction section configured to multiply a distance gain in which the Gb pixel or the G pixel is used as a reference by a distance balance gain of the R pixel;
- a second balance gain correction section configured to multiply the distance gain in which the Gb pixel or the G pixel is used as a reference by a distance balance gain of the B pixel; and
- a third balance gain correction section configured to multiply the distance gain in which the Gb pixel or the G pixel is used as a reference by a distance balance gain of the Gr pixel or the E pixel.

6. The image processing apparatus according to claim 1, further comprising a conversion section configured to perform a conversion, corresponding to thinning-out information of the image, on the first distance computed by the first distance computation section.

7. The image processing apparatus according to claim 1, wherein the obtaining section is configured to obtain the plurality of correction values by referring to a look-up table.

8. An image processing method for use with an image processing apparatus configured to correct shading of a captured image, the image processing method comprising:
- computing a first distance from an image-plane center to each pixel by multiplying a measured distance by a distance gain;
- obtaining a plurality of correction values for each pixel for correcting the shading of the captured image based on the first distance computed in the computing;
- setting a mixture-ratio of the plurality of correction values for each pixel obtained by the obtaining;
- mixing the plurality of correction values for each pixel to determine a final correction value for each pixel, based on the mixture-ratio setting set by the setting; and
- correcting the signal of each pixel based on the final correction value determined by the mixing.

9. The image processing method according to claim 8, further comprising, when the captured image is composed of three colors of a G pixel, an R pixel, and a B pixel:
- computing a second distance from the image-plane center to each pixel by multiplying the measured distance by a distance gain in accordance with the G pixel;
- multiplying the distance gain in which the G pixel is used as a reference by a distance balance gain of the R pixel; and
- multiplying the distance gain in which the G pixel is used as a reference by a distance balance gain of the B pixel.

10. The image processing method according to claim 8, further comprising, when the captured image is composed of four colors of a Gr pixel, an R pixel, a B pixel, and a Gb pixel, or four colors of an E pixel, an R pixel, a B pixel, and a G pixel:
- computing a second distance from the image-plane center to each pixel by multiplying the measured distance by a distance gain in accordance with the Gb pixel or the G pixel;
- multiplying the distance gain in which the Gb pixel or the G pixel is used as a reference by a distance balance gain of the R pixel;
- multiplying the distance gain in which the Gb pixel or the G pixel is used as a reference by a distance balance gain of the B pixel; and
- multiplying the distance gain in which the Gb pixel or the G pixel is used as a reference by a distance balance gain of the Gr pixel or the E pixel.

11. A recording medium having recorded thereon a computer-readable program executable to perform image processing of an image processing apparatus for correcting shading of a captured image, the program comprising:
- computing a first distance from an image-plane center to each pixel by multiplying a measured distance by a distance gain;
- obtaining a plurality of correction values for each pixel for correcting the shading of the captured image based on the first distance computed in the computing;
- setting a mixture-ratio of the plurality of correction values for each pixel obtained by the obtaining;
- mixing the plurality of correction values for each pixel to determine a final correction value for each pixel, based on the mixture-ratio set by the setting; and
- correcting the signal of each pixel based on the final correction value determined by the mixing.

12. The recording medium having recorded thereon a computer-readable program according to claim 11, the program further comprising, when the captured image is composed of three colors of a G pixel, an R pixel, and a B pixel:
- computing a second distance from the image-plane center to each pixel by multiplying the measured distance by a distance gain in accordance with the G pixel;
- multiplying the distance gain in which the G pixel is used as a reference by a distance balance gain of the R pixel; and
- multiplying the distance gain in which the G pixel is used as a reference by a distance balance gain of the B pixel.

13. The recording medium having recorded thereon a computer-readable program according to claim 11, the program further comprising, when the captured image is composed of four colors of a Gr pixel, an R pixel, a B pixel, and a Gb pixel, or four colors of an E pixel, an R pixel, a B pixel, and a G pixel:
- computing a second distance from an image-plane center to each pixel by multiplying the measured distance by a distance gain in accordance with the Gb pixel or the G pixel;
- multiplying the distance gain in which the Gb pixel or the G pixel is used as a reference by a distance balance gain of the R pixel;
- multiplying the distance gain in which the Gb pixel or the G pixel is used as a reference by a distance balance gain of the B pixel; and
- multiplying the distance gain in which the Gb pixel or the G pixel is used as a reference by a distance balance gain of the Gr pixel or the E pixel.

14. An image processing apparatus for correcting shading of a captured image, wherein the image processing apparatus comprises:
- first distance computation means for computing a first distance from an image-plane center to each pixel by multiplying a measured distance by a distance gain;
- obtaining means for obtaining a plurality of correction values for each pixel for correcting the shading of the image based on the first distance computed by the first distance computation means;

mixture-ratio setting means for setting a mixture-ratio of the plurality of correction values for each pixel obtained by the obtaining means;

mixing means for mixing the plurality of correction values for each pixel to determine a final correction value for each pixel, based on the mixture-ratio set by the mixture-ratio setting means; and correction means for correcting the signal of each pixel based on the final correction value determined by the mixing means.

15. The apparatus according to claim 14, further comprising:

second distance computation means for computing a second distance from an image-plane center to each pixel by multiplying the measured distance by a distance gain in accordance with a C pixel when the captured image is composed of three colors of the G pixel, an R pixel, and a B pixel;

first distance balance gain correction means for multiplying the distance gain in which the G pixel is used as a reference by a distance balance gain of the R pixel when the captured image is composed of three colors of the G pixel, the R pixel, and the B pixel; and second distance balance gain correction means for multiplying the distance gain in which the G pixel is used as a reference by a distance balance gain of the B pixel when the captured image is composed of three colors of the G pixel, the R pixel, and the B pixel.

16. The apparatus according to claim 14, further comprising:

second distance computation means for computing a second distance from an image-plane center to each pixel by multiplying the measured distance by a distance gain in accordance with a Gb pixel or a G pixel when the captured image is composed of four colors of the Gr pixel, an R pixel, a B pixel, and the Gb pixel, or four colors of an E pixel, the R pixel, the B pixel, and the G pixel;

first balance gain correction means for multiplying the distance gain in which the Gb pixel or the G pixel is used as a reference by a distance balance gain of the R pixel when the captured image is composed of four colors of the Gr pixel, the R pixel, the B pixel, and the Gb pixel, or four colors of the E pixel, the R pixel, the B pixel, and the G pixel;

second balance gain correction means for multiplying the distance gain in which the Gb pixel or the G pixel is used as a reference by a distance balance gain of the B pixel when the captured image is composed of four colors of the Gr pixel, the R pixel, the B pixel, and the Gb pixel, or four colors of the E pixel, the R pixel, the B pixel, and the G pixel; and third balance gain correction means for multiplying the distance gain in which the Gb pixel or the G pixel is used as a reference by a distance balance gain of the Gr pixel or the E pixel when the captured image is composed of four colors of the Gr pixel, the R pixel, the B pixel, and the Gb pixel, or four colors of the E pixel, the R pixel, the B pixel, and the G pixel.

* * * * *